(12) United States Patent
Waring et al.

(10) Patent No.: US 9,851,041 B2
(45) Date of Patent: Dec. 26, 2017

(54) TUBING EVERTING APPARATUS, ASSEMBLIES, AND METHODS

(71) Applicant: Emagineered Solutions, Inc., Redmond, OR (US)

(72) Inventors: Stephen T. Waring, Redmond, OR (US); Rossen Robert Huckfeldt, Redmond, OR (US)

(73) Assignee: Emagineered Solutions, Inc., Redmond, OR (US)

( * ) Notice: Subject to any disclaimer, the term of this patent is extended or adjusted under 35 U.S.C. 154(b) by 0 days.

(21) Appl. No.: 15/057,903

(22) Filed: Mar. 1, 2016

(65) Prior Publication Data

US 2016/0258566 A1 Sep. 8, 2016

Related U.S. Application Data

(60) Provisional application No. 62/128,107, filed on Mar. 4, 2015.

(51) Int. Cl.
*B29C 63/36* (2006.01)
*F16L 55/165* (2006.01)
(Continued)

(52) U.S. Cl.
CPC .......... *F16L 55/1651* (2013.01); *B29C 63/36* (2013.01); *F16L 55/18* (2013.01); *E03F 2003/065* (2013.01)

(58) Field of Classification Search
CPC . F16L 55/1651; F16L 55/18; E03F 2003/065; B29C 63/36
See application file for complete search history.

(56) References Cited

U.S. PATENT DOCUMENTS

| 2,277,286 A | 3/1942 | Bechtner |
| 2,333,826 A | 11/1943 | Smith et al. |

(Continued)

FOREIGN PATENT DOCUMENTS

| DE | 1079091 | 4/1960 |
| EP | 0620100 | 10/1994 |

(Continued)

OTHER PUBLICATIONS

English-language machine translation of Germany Patent Application Publication No. 1079091, dated Apr. 7, 1960.
(Continued)

*Primary Examiner* — Benjamin Fiorello
(74) *Attorney, Agent, or Firm* — DASCENZO Intellectual Property Law, P.C.

(57) ABSTRACT

Tubing everting apparatus, assemblies, and methods are disclosed herein. The tubing everting apparatus include a pressure chamber that defines an internal volume, a liner inlet port that is configured to receive a flexible tube liner into the internal volume, an inlet sealing structure that is configured to resist fluid flow therepast from the pressure chamber, and a liner outlet port that is configured to permit the flexible tube liner to extend from the internal volume. In some embodiments, the apparatus include a lubricator that is configured to apply a lubricant to the flexible tube liner. In some embodiments, the apparatus include a non-deflation valve that is configured to selectively transition between open and closed states. The assemblies include the apparatus and a cart that includes a lubricant reservoir. The methods include methods of operating the apparatus.

21 Claims, 8 Drawing Sheets

(51) Int. Cl.
*F16L 55/18* (2006.01)
*E03F 3/06* (2006.01)

(56) References Cited

U.S. PATENT DOCUMENTS

| | | | |
|---|---|---|---|
| 2,794,758 A | 6/1957 | Harper et al. | |
| 4,009,063 A | 2/1977 | Wood | |
| 4,043,157 A | 8/1977 | Schiffer | |
| 4,064,211 A | 12/1977 | Wood | |
| 4,076,173 A * | 2/1978 | Taccon | B22D 17/2007 137/114 |
| 4,077,610 A | 3/1978 | Masuda | |
| 4,135,958 A | 1/1979 | Wood | |
| 4,182,262 A | 1/1980 | Everson et al. | |
| 4,202,531 A | 5/1980 | Hamrick | |
| 4,368,091 A | 1/1983 | Ontsuga et al. | |
| 4,385,885 A | 5/1983 | Wood | |
| 4,427,480 A | 1/1984 | Kamuro et al. | |
| 4,456,401 A | 6/1984 | Williams | |
| 4,581,085 A | 4/1986 | Wood | |
| 4,602,974 A | 7/1986 | Wood et al. | |
| 4,626,133 A | 12/1986 | Waring | |
| 4,640,313 A | 2/1987 | Stanley | |
| 4,655,638 A | 4/1987 | Waring | |
| 4,668,125 A | 5/1987 | Long | |
| 4,685,983 A | 8/1987 | Long | |
| 4,752,511 A | 6/1988 | Driver | |
| 4,770,562 A | 9/1988 | Muller et al. | |
| 4,883,557 A | 11/1989 | Morinaga et al. | |
| 4,948,452 A | 8/1990 | Morinaga et al. | |
| 5,044,405 A | 9/1991 | Driver et al. | |
| 5,154,936 A | 10/1992 | Driver et al. | |
| 5,223,204 A | 6/1993 | Endoh | |
| 5,358,359 A | 10/1994 | Long | |
| 5,374,174 A | 12/1994 | Long | |
| 5,490,964 A | 2/1996 | Kamiyama et al. | |
| 5,501,248 A | 3/1996 | Kiest | |
| 5,520,484 A | 5/1996 | Kamiyama et al. | |
| 5,597,353 A | 1/1997 | Alexander | |
| 5,676,175 A | 10/1997 | Bar et al. | |
| 5,700,110 A | 12/1997 | Kamiyama et al. | |
| RE35,944 E | 11/1998 | Driver et al. | |
| 5,855,729 A | 1/1999 | Kiest et al. | |
| 5,916,406 A | 6/1999 | Kamiyama et al. | |
| 5,927,341 A | 7/1999 | Taylor | |
| 5,942,183 A | 8/1999 | Alexander | |
| 5,969,234 A | 10/1999 | Weigele | |
| 6,054,180 A | 4/2000 | Kamiyama et al. | |
| 6,170,531 B1 | 1/2001 | Jung et al. | |
| 6,244,846 B1 | 6/2001 | Keller | |
| 6,354,330 B1 | 3/2002 | Wood | |
| 6,354,334 B1 | 3/2002 | Ellyin et al. | |
| 6,390,795 B1 | 5/2002 | Waring et al. | |
| 6,539,979 B1 | 4/2003 | Driver | |
| 6,641,687 B2 | 11/2003 | Kiest et al. | |
| 6,679,293 B2 | 1/2004 | Driver | |
| 6,682,668 B1 | 1/2004 | Driver et al. | |
| 6,708,728 B2 | 3/2004 | Driver et al. | |
| 6,732,763 B2 | 5/2004 | Williamson et al. | |
| 6,827,526 B2 | 12/2004 | Warren | |
| 6,837,273 B2 | 1/2005 | Woolstencroft et al. | |
| 6,899,832 B2 | 5/2005 | Wood | |
| 6,960,313 B2 | 11/2005 | Waring et al. | |
| 6,969,216 B2 | 11/2005 | Driver | |
| 7,051,766 B2 | 5/2006 | Kamiyama et al. | |
| 7,096,890 B2 | 8/2006 | Woolstencroft et al. | |
| 7,108,456 B2 | 9/2006 | Driver et al. | |
| 7,124,570 B2 | 10/2006 | Blatter et al. | |
| 7,360,559 B2 | 4/2008 | Driver et al. | |
| 7,476,348 B2 | 1/2009 | Waring | |
| 7,517,212 B2 | 4/2009 | Blackmore et al. | |
| 7,527,076 B2 | 5/2009 | Lepola et al. | |
| RE43,910 E | 1/2013 | Waring | |
| 2003/0168161 A1 | 9/2003 | Wood | |
| 2004/0020544 A1 | 2/2004 | Kamiyama et al. | |
| 2006/0060255 A1 | 3/2006 | Driver et al. | |
| 2006/0093436 A1 | 5/2006 | Gearhart | |
| 2006/0137816 A1 | 6/2006 | Taylor et al. | |
| 2006/0197262 A1* | 9/2006 | Waring | F16L 55/1651 264/516 |
| 2007/0113971 A1 | 5/2007 | Driver et al. | |
| 2007/0114689 A1 | 5/2007 | Driver et al. | |
| 2010/0122767 A1 | 5/2010 | Taylor et al. | |
| 2011/0006274 A1* | 1/2011 | Roggenkamp | F16N 7/32 254/134.3 R |
| 2011/0111124 A1* | 5/2011 | Pawelski | B21B 27/10 427/255.25 |

FOREIGN PATENT DOCUMENTS

| | | |
|---|---|---|
| GB | 1044645 | 10/1966 |
| JP | 01-204726 | 8/1989 |
| JP | 07-232377 | 9/1995 |

OTHER PUBLICATIONS

English-language machine translation of Japan Patent Application Publication No. 01-204726, dated Aug. 17, 1989.

English-language machine translation of Japan Patent Application Publication No. 07-232377, dated Sep. 5, 1995.

Griffin, Jeff, "Air inversion CIPP increases productivity," Underground Construction, ISSN: 1092-8634, p. 49, Nov. 2004.

Tanis, Debra, "New Technique for Waterstop Replacement Used at Pine Flat Dam," The REMR Bulletin, vol. 2, No. 3, pp. 1-3, Sep. 1985.

McDonald, James E., *Repair of Waterstop Failures: Case Histories*, Technical Report REMR-CS-4, cover and pp. 112-146, U.S. Army Corps of Engineers, Nov. 1986.

* cited by examiner

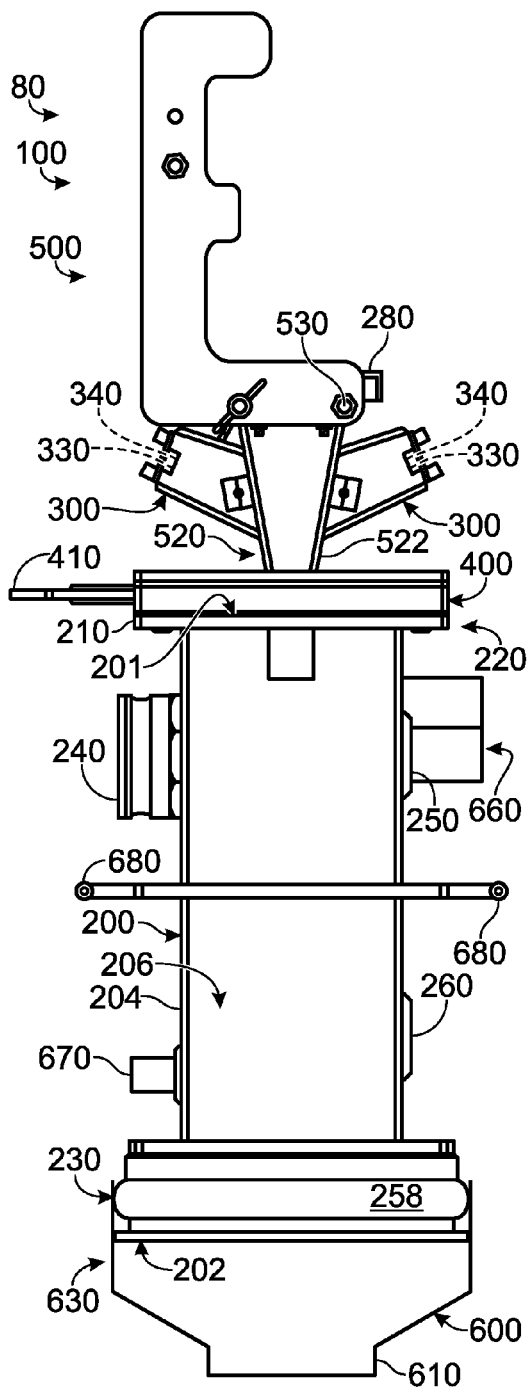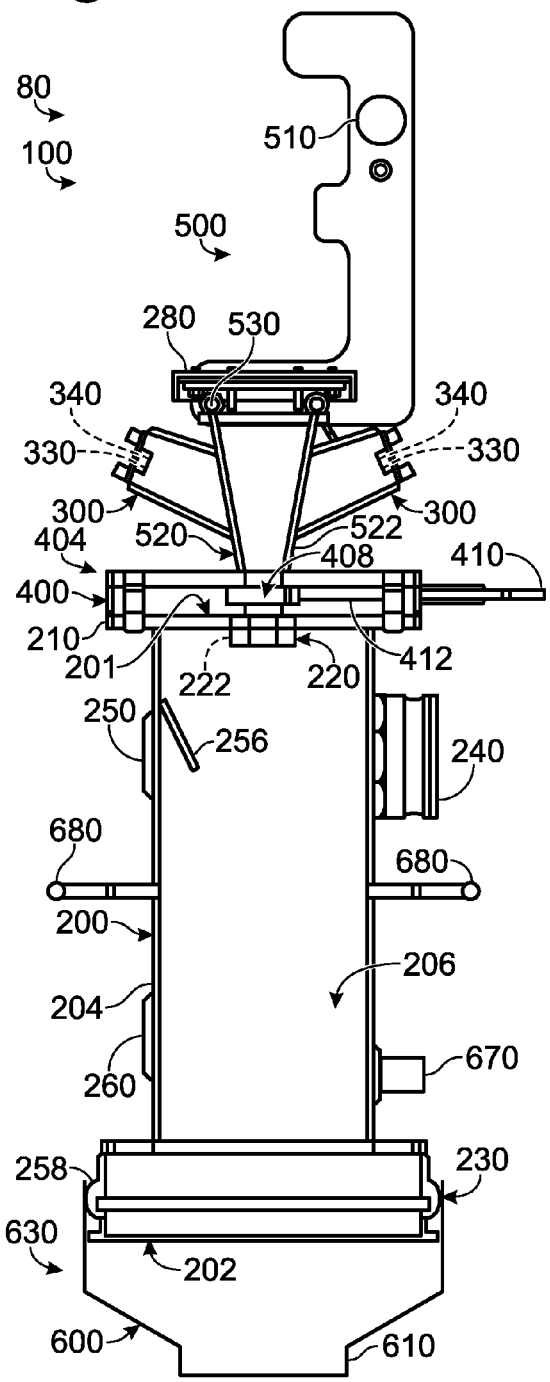

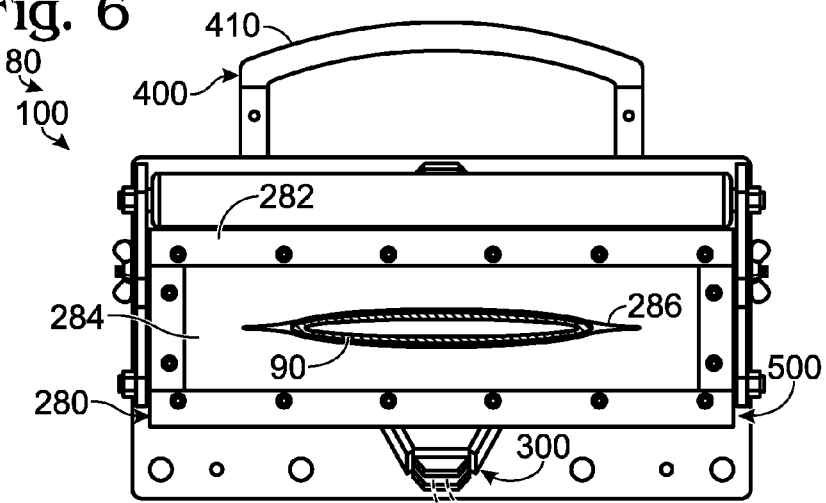
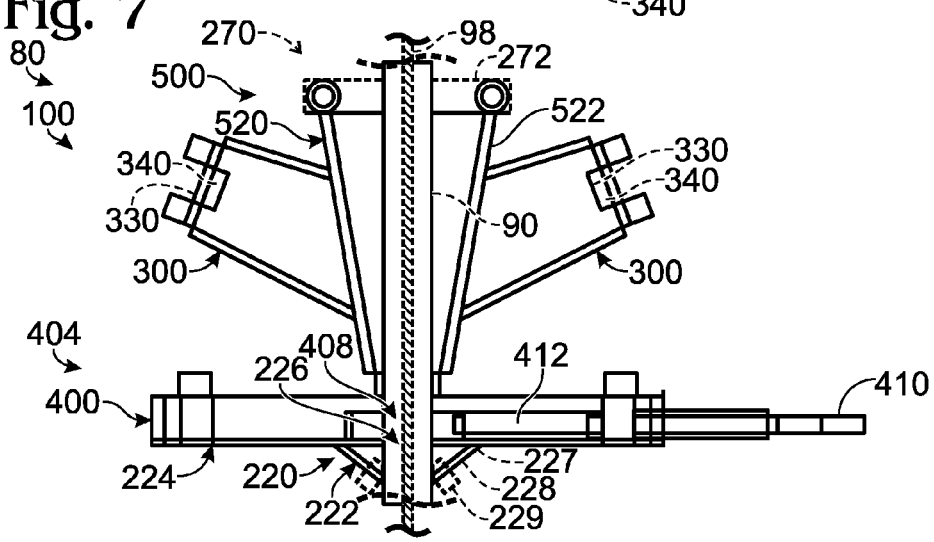
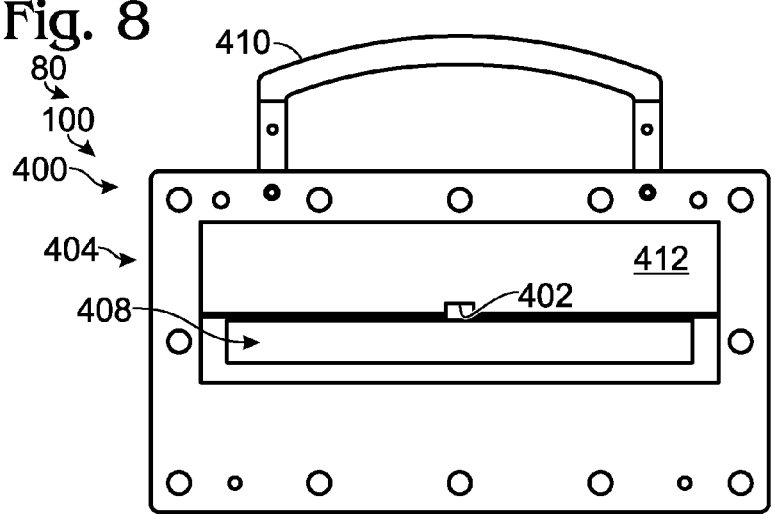

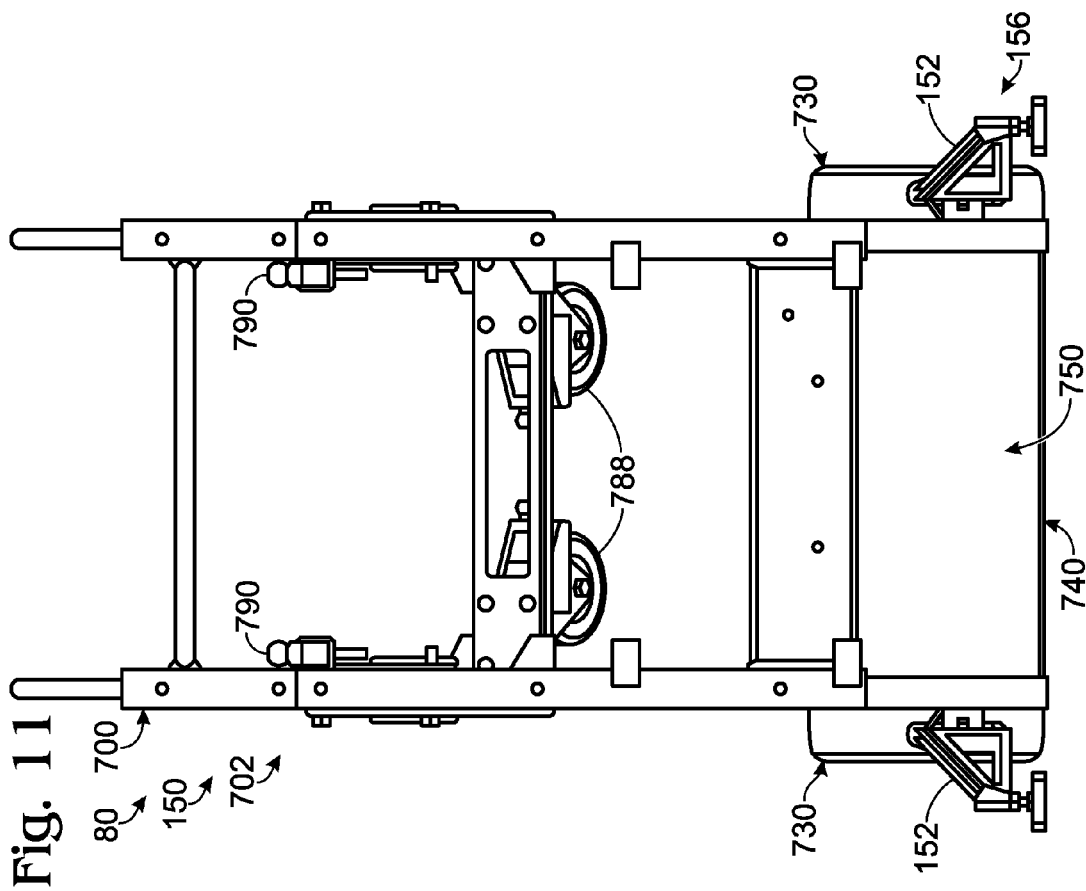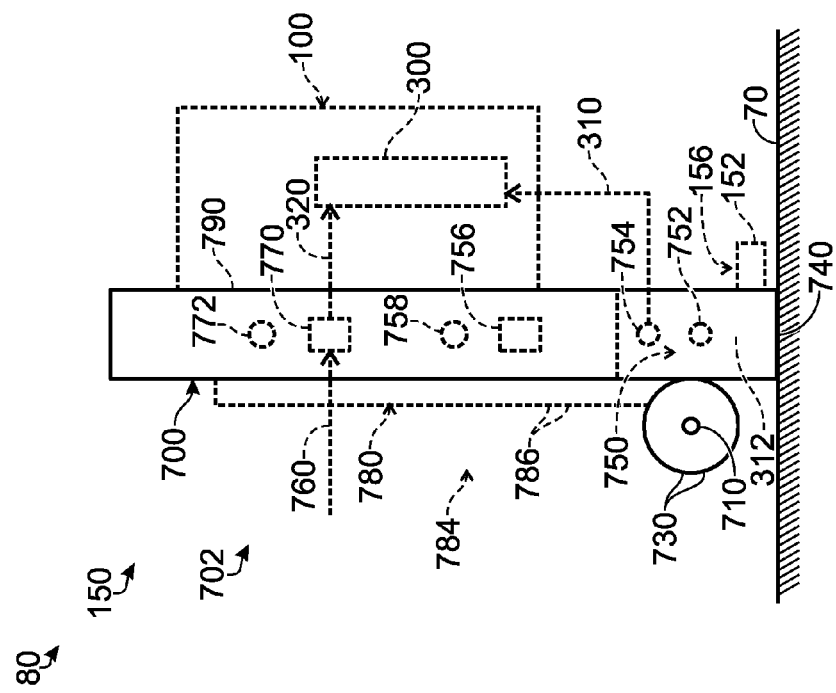

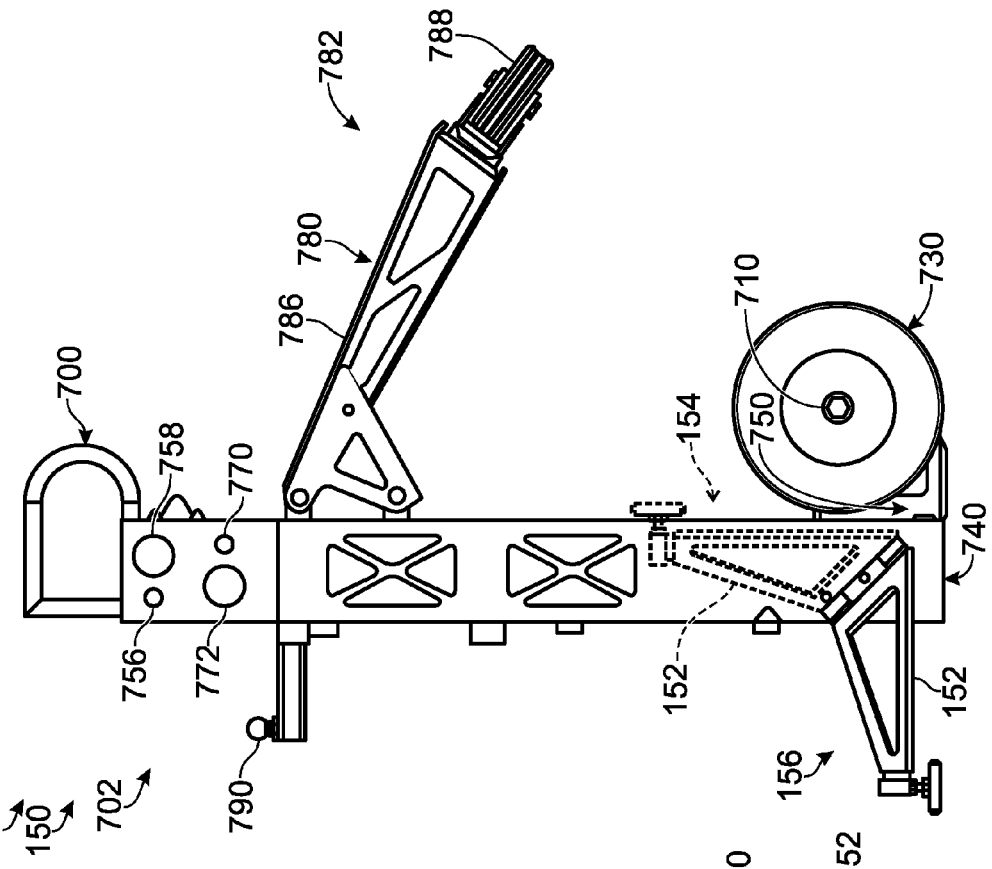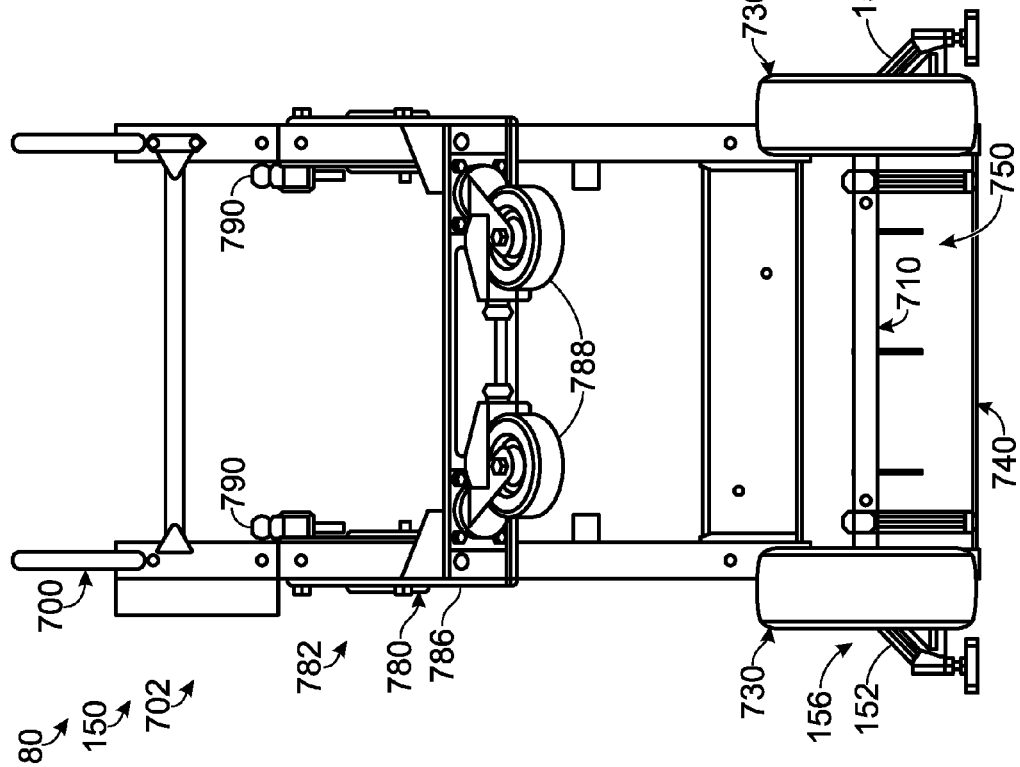

TUBING EVERTING APPARATUS, ASSEMBLIES, AND METHODS

RELATED APPLICATION

This application claims priority to U.S. Provisional Patent Application No. 62/128,107, which was filed on Mar. 4, 2015, and the complete disclosure of which is hereby incorporated by reference.

FIELD OF THE DISCLOSURE

The present disclosure relates generally to tubing everting apparatus, assemblies, and methods.

BACKGROUND OF THE DISCLOSURE

A tubing everting apparatus may be utilized to line an existing tubular, such as a pipe, a drain pipe, and/or a sewer pipe, with a flexible tube liner. The flexible tube liner subsequently may be cured in place within the existing tubular to at least substantially fix a conformation of the flexible tube liner and/or to resist subsequent deformation of the flexible tube liner. Such a process may be utilized to repair and/or rehabilitate existing tubulars that may be broken, cracked, and/or damaged, thereby decreasing and/or eliminating fluid leakage and/or infiltration from the existing tubular. Additionally or alternatively, such a process also may be utilized to line the existing tubular with a flexible tube liner that is chemically resistant to a fluid that may be flowed within the existing tubular, thereby permitting the existing tubular to convey a fluid that otherwise may be damaging and/or corrosive to a material of construction of the existing tubular.

Conventional tubing everting apparatus often utilize compressed air and/or pressurized water to evert the flexible tube liner within the existing tubular. During the eversion process, a frictional force experienced by the flexible tube liner may be significant, and it may be desirable to lubricate the flexible tube liner to decrease this frictional force. However, conventional tubing everting apparatus generally do not include a provision for convenient and/or automated lubrication of the flexible tube liner during the eversion process. In addition, it also may be desirable to regulate and/or restrict loss of compressed air and/or of pressurized water during the eversion process. However conventional tubing everting apparatus generally do not include a provision to regulate and/or restrict this loss, especially after a tail end of the flexible tube liner has been conveyed through the conventional tubing everting apparatus. Furthermore, it often may be desirable to quickly and/or easily transport a tubing everting apparatus from one job site to the next and/or from one location to the next within a given job site. However, conventional tubing everting apparatus often are not easily transportable and/or may require a significant amount of disassembly prior to transport and subsequent reassembly after transport. Thus there exists a need for improved tubing everting apparatus, for assemblies that include the improved tubing everting apparatus, and/or for methods of operating the improved tubing everting apparatus.

SUMMARY OF THE DISCLOSURE

Tubing everting apparatus, assemblies, and methods are disclosed herein. The tubing everting apparatus include a pressure chamber that defines an internal volume and is configured to be pressurized, by a pressurizing fluid stream, to provide a motive force for eversion of a flexible tube liner. The apparatus also include a liner inlet port that is associated with a first side of the pressure chamber and configured to receive a flexible tube liner into the internal volume. The apparatus further include an inlet sealing structure that is associated with the liner inlet port and configured to resist fluid flow therepast and from the pressure chamber. The apparatus also include a liner outlet port that is associated with a second side of the pressure chamber and configured to permit the flexible tube liner to extend from the internal volume.

In some embodiments, the apparatus include a lubricator that is configured to apply a lubricant to the flexible tube liner. In these embodiments, the lubricator may be operatively attached to the pressure chamber and may apply the lubricant to decrease a frictional force on the flexible tube liner during eversion of the flexible tube liner.

In some embodiments, the apparatus include a non-deflation valve that is spaced-apart from the inlet sealing structure. The non-deflation valve is configured to selectively transition between an open state, in which the non-deflation valve permits the flexible tube liner to pass through the liner inlet port, and a closed state, in which the non-deflation valve restricts fluid flow of the pressurizing fluid stream from the pressure chamber, via the liner inlet port, when the pressure chamber is pressurized by the pressurizing fluid stream and a tail end of the flexible tube liner has passed through the liner inlet port.

The assemblies include the apparatus and a cart. The cart includes a cart body, at least two wheels that are rotatingly coupled to the cart body, a base that is configured to support the cart, and a lubricant reservoir. The lubricant reservoir is configured to contain a lubricant and to provide the lubricant to the apparatus as a pressurized lubricant stream, which also may be referred to herein as an adjustable pressure lubricant stream.

The methods include extending a leading end of a flexible tube liner through a liner inlet port of a pressure chamber of a tubing everting apparatus, through an internal volume of the pressure chamber, and through a liner outlet port of the pressure chamber. The methods further include forming an at least partial fluid seal between an inlet sealing structure and a portion of the flexible tube liner that extends through the inlet sealing structure. The methods also include operatively attaching the leading end of the flexible tube liner to a liner attachment point of the apparatus and forming an at least partial fluid seal between the leading end of the flexible tube liner and the liner attachment point. The methods further include lubricating the flexible tube liner with a lubricator and pressurizing the pressure chamber with a pressurizing fluid stream.

BRIEF DESCRIPTION OF THE DRAWINGS

FIG. 4 is a less schematic side view of a tubing everting apparatus according to the present disclosure.

FIG. 5 is a less schematic cross-sectional view of the tubing everting apparatus of FIG. 2 taken along line 5-5 of FIG. 2.

FIG. 6 is a top view of a lubricant shield that may be included in and/or utilized with a tubing everting apparatus according to the present disclosure.

FIG. 7 is a less schematic cross-sectional view of a portion of a tubing everting apparatus according to the present disclosure.

FIG. 8 is a top view of a non-deflation valve, which may be included in and/or utilized with a tubing everting apparatus according to the present disclosure, illustrated in an open state.

FIG. 10 is a schematic representation of a cart, according to the present disclosure, in an upright orientation.

FIG. 11 is a less schematic front view of a cart according to the present disclosure.

FIG. 12 is a less schematic rear view of a cart according to the present disclosure.

FIG. 13 is a less schematic side view of a cart according to the present disclosure.

DETAILED DESCRIPTION AND BEST MODE OF THE DISCLOSURE

Figure 1:
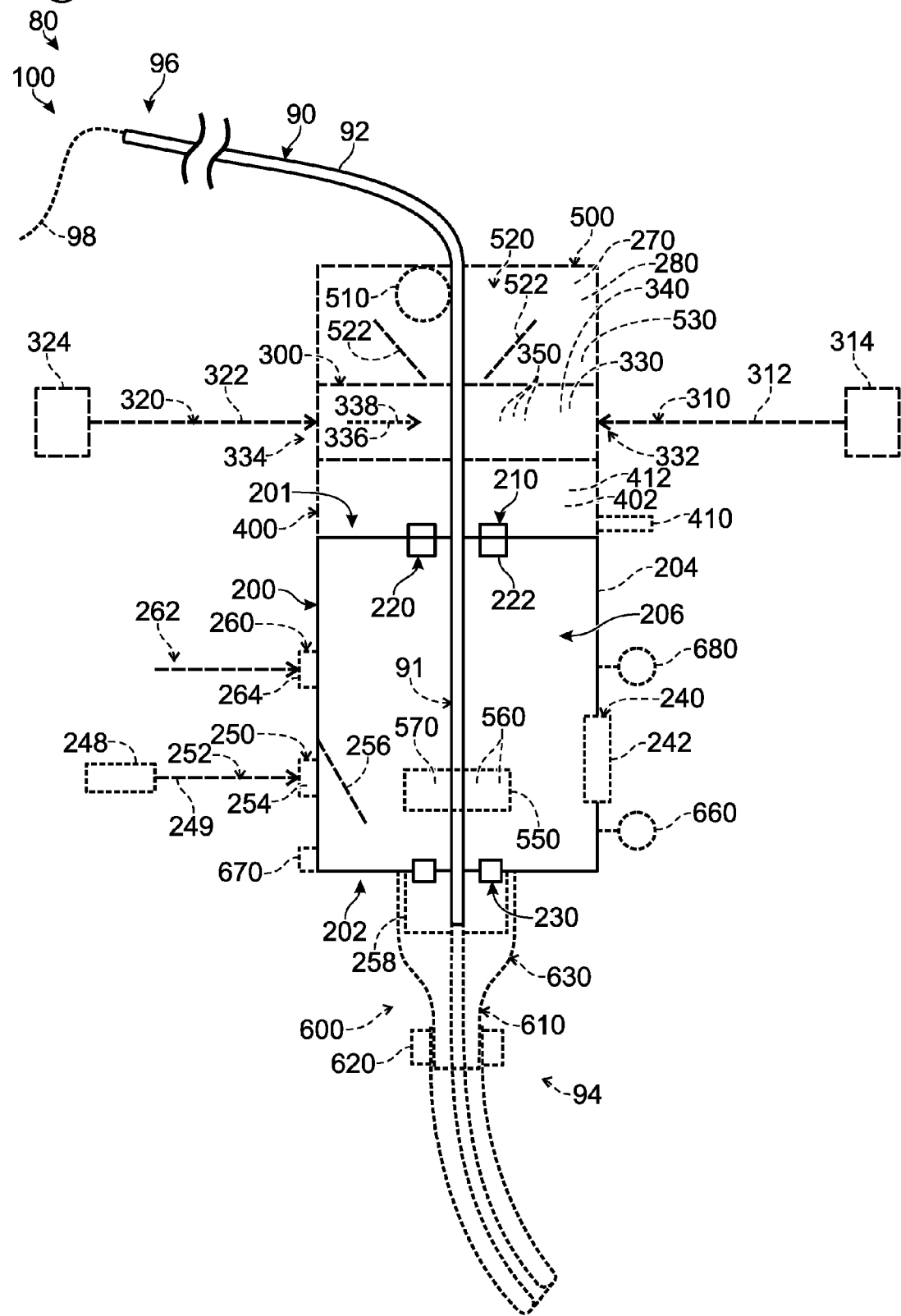
FIG. 1 is a schematic representation of examples of a tubing everting apparatus according to the present disclosure.

FIGS. 1-16 provide examples of tubing everting apparatus 100, according to the present disclosure, of carts 150, according to the present disclosure, of tubing everting assemblies 80 that include tubing everting apparatus 100 and/or carts 150, and/or of methods 800 of operating tubing everting assemblies 80 and/or tubing everting apparatus 100. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency. Elements, components, and/or features that are discussed herein with reference to one or more of FIGS. 1-16 may be included in and/or utilized with any of FIGS. 1-16 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIGS. 1-9 are examples of tubing everting apparatus 100, according to the present disclosure, and/or of components thereof. Tubing everting apparatus 100 also may be referred to herein as everting apparatus 100 and/or as apparatus 100, and it may form a portion of a tubing everting assembly 80, as discussed in more detail herein.

As illustrated in solid lines in FIGS. 1-5, apparatus 100 includes a pressure chamber 200 that defines an internal volume 206. As illustrated in FIG. 1, pressure chamber 200 is configured to be pressurized by a pressurizing fluid stream 252, such as a pressurizing air stream from a compressor and/or a pressurizing water stream from a pump, to provide a motive force for eversion of a flexible tube liner 90. Apparatus 100 further includes a liner inlet port 210, which is associated with a first side 201 of the pressure chamber and is designed, adapted, configured, sized, and/or shaped to receive flexible tube liner 90 into internal volume 206. First side 201 also may be referred to herein as a top side 201, an upper side 201, and/or an inlet side 201.

Flexible tube liners 90 may be available in a variety of shapes, sizes, configurations, and/or with a variety of materials of construction, such as to permit the flexible tube liners to line existing tubulars of varying cross-sectional shape, cross-sectional area, and/or cross-sectional diameter and/or to permit the flexible tube liners to carry fluids of varying chemical composition. As such, apparatus 100 may be adjustable and/or may be configured to be adjusted to accommodate a range of different flexible tube liners 90. As examples, apparatus 100 may be configured to be adjusted to accommodate flexible tube liners 90 with an installed diameter of, an effective diameter of, or that are sized to line a tube with an inside diameter of, at least 10 centimeters (cm), at least 15 cm, at least 20 cm, at least 25 cm, at least 30 cm at least 35 cm, at least 40 cm, at least 50 cm, or at least 60 cm. Additionally or alternatively, apparatus 100 also may be configured to be adjusted to accommodate flexible tube liners 90 with an installed diameter of, or that are sized to line a tube with an inside diameter of, at most 100 cm, at most 90 cm, at most 80 cm, at most 70 cm, at most 60 cm, at most 50 cm, at most 40 cm, or at most 30 cm.

Apparatus 100 also includes an inlet sealing structure 220, as illustrated in FIGS. 1-5 and 7. Inlet sealing structure 220 is designed, adapted, configured, sized, and/or shaped to resist fluid flow therepast from internal volume 206 of pressure chamber 200, at least when flexible tube liner 90 extends through the inlet sealing structure. In addition, inlet sealing structure 220 may be configured to be adjusted to accommodate the range of different sizes and types of flexible tube liners 90.

Inlet sealing structure 220 may include one or more sealing lips 222. As perhaps best illustrated in FIGS. 1 and 7, sealing lips 222 may be configured to press against flexible tube liner 90 and/or to form an at least partial fluid seal with flexible tube liner 90. In addition, sealing lips 222 may be configured to maintain the at least partial fluid seal as long as flexible tube liner 90 is in contact therewith and/or despite motion, such as sliding motion, of flexible tube liner 90 through and/or past sealing lips 222. Sealing lips 222 may be adjustable to accommodate the range of different flexible tube liners. Additionally or alternatively, sealing lips 222 may be configured to be replaced.

Apparatus 100 further includes a liner outlet port 230, which is associated with a second side 202 of pressure chamber 200. Liner outlet port 230 is designed, adapted, configured, sized, and/or shaped to permit flexible tube liner 90 to exit and/or to extend from internal volume 206 of pressure chamber 200. Second side 202 also may be referred to herein as a bottom side 202, a lower side 202, and/or an outlet side 202 of pressure chamber 200.

As illustrated in dashed lines in FIG. 1 and in solid lines in FIGS. 2-5 and 7, apparatus 100 further may include a lubricator 300, which may be operatively attached to and/or may form a portion of pressure chamber 200. As illustrated in FIG. 1, lubricator 300 may be configured to apply a lubricant 312 to flexible tube liner 90, such as to produce and/or generate a lubricated flexible tube liner 91. Lubricant 312 may decrease a frictional force exerted on and/or experienced by the flexible tube liner during eversion of the flexible tube liner by apparatus 100. Any suitable lubricant may be used, with the composition, viscosity, etc. being selected based on such factors as the size of the liner, the liner composition, the size of pipe to be lined, the length of pipe to be lined, the expected fluid to flow within the everted flexible tube liner, etc. As examples, lubricant 312 may include one or more of an oil, mineral oil, vegetable oil, peanut oil, a surfactant, an aqueous surfactant solution, a soap, and soapy water.

Lubricator 300 may include any suitable type and number of structures that may be adapted, configured, designed, and/or constructed to apply the lubricant to the flexible tube liner and/or to an external surface 92 of the flexible tube liner. As an example, lubricator 300 may include at least one atomizer 330. Atomizer 330 may be configured to atomize lubricant 312 prior to, to permit, and/or to facilitate application of the lubricant to the flexible tube liner. As illustrated in FIG. 1, atomizer 330 may include a lubricant inlet 332 and a pressurized air inlet 334. Lubricant inlet 332 may be configured to receive a lubricant stream 310 that includes lubricant 312. Similarly, pressurized air inlet 334 may be configured to receive a pressurized air stream 320 that includes pressurized air 322. Atomizer 330 further may be configured to atomize the lubricant stream with, or within, the pressurized air stream to generate an atomized lubricant stream 336. The atomized lubricant stream may be directed toward and/or may be applied to the flexible tube liner within lubricator 300.

As another example, lubricator 300 additionally or alternatively may include at least one ejector-jet pump 340. The ejector-jet pump may include lubricant inlet 332 and pressurized air inlet 334. The lubricant inlet may be configured to receive lubricant stream 310, and the pressurized air inlet may be configured to receive pressurized air stream 320. The ejector-jet pump further may be configured to entrain the lubricant within the pressurized air stream to generate an entrained lubricant stream 338, which may be applied to flexible tube liner 90.

When lubricator 300 includes an atomizer 330, ejector-jet pump 340, or a similar device for applying lubricant 312 on the flexible tube liner 90, more than one such applicator may be utilized, such as to increase the amount of applied lubricant 312 and/or the percentage of external surface 92 of the flexible tube liner to which lubricant 312 is applied. As one example, and as illustrated by FIGS. 2-5 and 7, at least a pair of generally opposed applicators has proven effective to lubricate a flexible tube liner 90 that is drawn between the applicators during the eversion process. As yet another example, and as illustrated in FIG. 1, lubricator 300 may include one or more nozzles 350. Nozzles 350 may be configured to direct and/or apply one or more lubricant streams 310 to flexible tube liner 90.

As illustrated in FIGS. 1-5 and 7, lubricator 300 may be configured to apply the lubricant to the flexible tube liner prior to the flexible tube liner being received within internal volume 206 of pressure chamber 200 and/or prior to the flexible tube liner passing through liner inlet port 210. Additionally or alternatively, and as also illustrated in FIG. 1, lubricator 300 may be configured to apply the lubricant to the flexible tube liner prior to the flexible tube liner passing through inlet sealing structure 220. However, these configurations are not required. As an example, lubricator 300 may be located within and/or may be internal to pressure chamber 200. In such an embodiment, lubricator 300 may be configured to apply the lubricant to the flexible tube liner after the flexible tube liner passes through liner inlet port 210 and/or inlet sealing structure 220, and/or after the flexible tube liner enters pressure chamber 200.

It is within the scope of the present disclosure that, during eversion of flexible tube liner 90 by apparatus 100, lubricator 300 (or a lubricant emission point thereof, such as nozzles 350) may be spaced apart from flexible tube liner 90 by at least a threshold spray distance. Examples of the threshold spray distance include threshold spray distances of at least 1 cm, at least 2 cm, at least 3 cm, at least 4 cm, at least 6 cm, at least 8 cm, and/or at least 10 cm. Additional examples of the threshold spray distance include threshold spray distances of less than 20 cm, less than 18 cm, less than 16 cm, less than 14 cm, less than 12 cm, and/or less than 10 cm.

As illustrated in dashed lines in FIG. 1, apparatus 100 further may include and/or be in fluid communication with a lubricant source 314. As discussed in more detail herein, lubricant source 314 optionally may be a lubricant reservoir in a cart that supports and transports tubing everting apparatus 100. Lubricant source 314 may be configured to provide lubricant stream 310 to lubricator 300.

Additionally or alternatively, apparatus 100 also may include and/or be in fluid communication with a pressurized air source 324, such as a compressor. Pressurized air source 324 may be configured to provide pressurized air stream 320 to lubricator 300. The pressurized air stream additionally or alternatively may be utilized to propel the lubricant to the lubricator.

As illustrated in dashed lines in FIG. 1 and in solid lines in FIGS. 2-6, apparatus 100 further may include a lubricant splash guard 280. Lubricant splash guard 280, when present, may be configured to limit and/or restrict flow of lubricant 312 out of apparatus 100. As perhaps best illustrated in FIG. 6, which is a top view of apparatus 100 including lubricant splash guard 280, the lubricant splash guard may include a mounting frame 282 and a flexible splash guard 284. Mounting frame 282 may operatively attach the lubricant splash guard to a remainder of assembly 100, such as to an infeed assembly 500. Flexible splash guard 284 may include a slit 286, which may be sized to permit the flexible tube liner 90 to pass therethrough. In some embodiments, lubricant splash guard 280 and/or a flexible splash guard 284 thereof may be presized for use with a particular size and/or type of flexible tube liner 90. In some embodiments, flexible splash guard 284 may be configured to be cut, by a user, to produce a desired length for slit 286 and/or to permit the user to select the size of slit 286 based upon a size of flexible tube liner 90. In these embodiment, flexible splash guard 284 may be configured to be replaced, such as by the user, to permit utilization of the lubricant splash guard with another, or a different sized, flexible tube liner 90.

As illustrated in dashed lines in FIG. 1 and in solid lines in FIGS. 2-9, apparatus 100 additionally or alternatively may include a non-deflation valve 400, which may be spaced-apart and/or separate from inlet sealing structure 220. Non-deflation valve 400, when present, may include and/or define an open state 404, which is perhaps illustrated most clearly in FIGS. 5 and 7-8, and a closed state 406, which is perhaps illustrated most clearly in FIG. 9. When in open state 404, non-deflation valve 400 may be configured to permit the flexible tube liner to pass through an aperture 408 of the non-deflation valve and/or through liner inlet port 210. Conversely, when in closed state 406, non-deflation valve 400 may not permit the flexible tube liner to pass through aperture 408 and/or may restrict fluid flow through aperture 408.

Stated another way, non-deflation valve 400 may be adapted, configured, designed, and/or constructed to selectively restrict fluid flow of pressurizing fluid stream 252 from pressure chamber 200 through and/or via liner inlet port 210 when pressure chamber 200 is pressurized by the pressurizing fluid and a tail end 96 of flexible tube liner 90, which is illustrated in FIG. 1, has passed through the liner inlet port (i.e., when the flexible tube liner no longer extends through the liner inlet port). Examples of non-deflation valve 400 include any suitable plate valve, knife valve, and/or flapper valve. As such, at least a portion of non-deflation valve 400 may be configured to pivot, slide, and/or deform upon transitioning between the open state and the closed state. Non-deflation valve 400 additionally or alternatively may be referred to as a non-deflation mechanism 400, a pressure-retention valve 400, and/or a pressure-retention mechanism 400.

Stated yet another way, when non-deflation valve 400 is in open state 404, the non-deflation valve may have and/or define a first cross-sectional area for fluid flow therethrough (such as a cross-sectional area of aperture 408 of FIG. 8). Conversely, when non-deflation valve 400 is in closed state 406, the non-deflation valve may have and/or define a second cross-sectional area for fluid flow therethrough, such as may be illustrated in FIG. 9. The first cross-sectional area may be greater than the second cross-sectional area.

It is within the scope of the present disclosure that non-deflation valve 400 may include and/or be a manually actuated non-deflation valve 400. Under these conditions, a user may selectively actuate (or close) the manually actuated non-deflation valve subsequent to the tail end of the flexible tube liner passing through the liner inlet port. As an example, and when the non-deflation valve includes the plate valve and/or the knife valve, the user may manually actuate a handle 410 to close the plate valve and/or the knife valve to at least substantially, and optionally completely, obstruct the liner inlet port to restrict the flow of pressurizing fluid therethrough. Handle 410 may be configured to be grasped by the user to transition the non-deflation valve between the open state and the closed state.

Additionally or alternatively, it is also within the scope of the present disclosure that non-deflation valve 400 may include and/or be an automatically actuated non-deflation valve 400. Under these conditions, the automatically actuated non-deflation valve may be configured to be automatically actuated subsequent to, or responsive to, the pressurizing fluid stream pressurizing the pressure chamber and the tail end of the flexible tube liner passing through the non-deflation valve. As an example, and when the non-deflation valve includes the flapper valve, the flapper valve may be held open by the presence of the flexible tube liner extending therethrough and may automatically close subsequent to, or responsive to, the flexible tube liner no longer extending therethrough. This automatic closure may be a result of a pressure force that is exerted on the non-deflation valve, such as by the pressurizing fluid that pressurizes the pressure chamber. Additionally or alternatively, this automatic closure may be a result of a biasing mechanism, such as a resilient member and/or a spring, that biases the flapper valve closed.

As illustrated schematically in FIG. 1 and in more detail in FIGS. 5 and 7-9, non-deflation valve 400 may include a sliding valve plate 412. Sliding valve plate 412 may be operatively attached to handle 410 such that the sliding valve plate is actuated by, or via, the handle to transition the non-deflation valve between the open and closed states.

Figure 9:
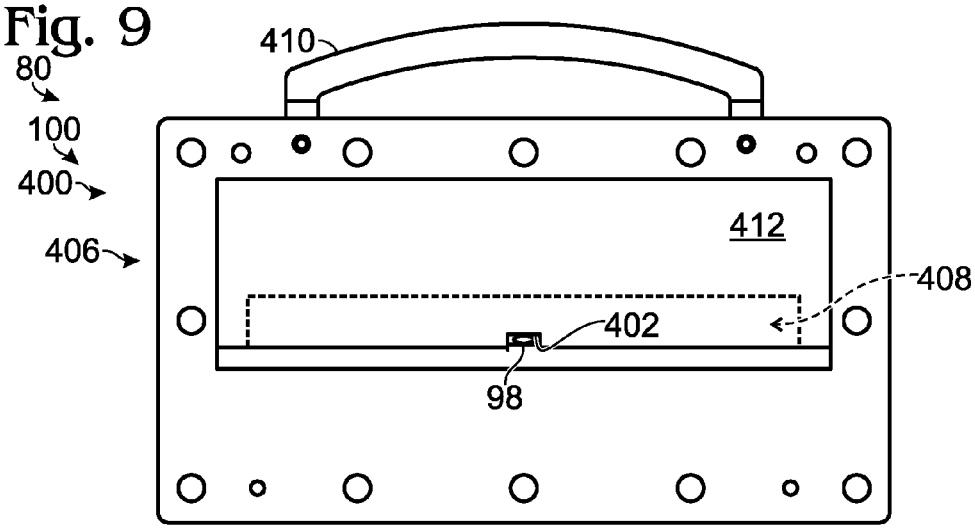
FIG. 9 is a top view of the non-deflation valve of FIG. 8 illustrated in a closed, or at least partially closed, state.

As further illustrated schematically in FIG. 1 and in more detail in FIGS. 8-9, non-deflation valve 400 and/or sliding valve plate 412 thereof also may include and/or define an optional recess 402. Recess 402 may be sized to permit a tether 98, which may be attached to tail end 96 of flexible tube liner 90, to extend therethrough while the non-deflation valve is in closed state 406 (i.e., while the non-deflation valve restricts flow of the pressurizing fluid stream from the pressure chamber via the liner inlet port). Such a configuration may permit a user to control a rate at which flexible tube liner 90 is everted by apparatus 90 subsequent to tail end 96 passing through the liner inlet port and/or to withdraw the tail end should there be a need to do so. When no tether is utilized, non-deflation valve 400 optionally may be configured to close even further, thereby restricting fluid flow through recess 402.

Recess 402 additionally or alternatively may be referred to as a notch 402, tether port 402, and/or tether aperture 402. Tether 98, when present, may be any suitable rope, cord, strap, cable, or plastic-coated cable.

As illustrated in FIGS. 1-5, non-deflation valve 400 may be located between lubricator 300 and liner inlet port 210 of pressure chamber 200. However, this configuration is not required.

As further illustrated in dashed lines in FIG. 1 and in solid lines in FIGS. 2-5 and 7, apparatus 100 additionally or alternatively may include infeed assembly 500. Infeed assembly 500 may be configured to direct flexible tube liner 90 into and/or toward liner inlet port 210.

Infeed assembly 500 may include an infeed roller 510. Infeed roller 510 may be configured to decrease a frictional force on flexible tube liner 90 during a change in a trajectory of the flexible tube liner, as illustrated in FIG. 1. Infeed roller 510 additionally or alternatively may be utilized to facilitate the trajectory change without kinking and/or twisting of the flexible tube liner.

Infeed assembly 500 additionally or alternatively may include a tapered region 520. Tapered region 520 may be shaped and/or sized to direct flexible tube liner 90 toward liner inlet 210 of pressure chamber 200. As an example, tapered region 520 may include a pair of opposed planar surfaces 522 that are oriented at a skew angle relative to one another. As a more specific example, planar surfaces 522 may be oriented such that a distance between the pair of opposed planar surfaces at a side that is proximal to liner inlet port 210 is less than a distance between the pair of planar surfaces at a side that is distal the liner inlet port, as illustrated.

It is within the scope of the present disclosure that infeed assembly 500 may include and/or be a pivoting infeed assembly 500 that may be configured to operatively rotate and/or pivot relative to pressure chamber 200 about a pivot point 530, as illustrated in FIGS. 1-5. Under these conditions, pivoting infeed assembly 500 may be configured to operatively pivot between a directing configuration and a storage configuration. When the pivoting infeed assembly is in the directing configuration, the pivoting infeed assembly may be oriented to direct the flexible tube liner toward and/or into liner inlet port 210, and apparatus 100 may define an in-use height. Conversely, when the pivoting infeed assembly is in the storage configuration, apparatus 100 may define a storage height. The storage height may be less than the in-use height, thereby permitting storage and/or transportation of apparatus 100 that include pivoting infeed assemblies 500 in structures and/or vehicles that may not be sized to house and/or contain apparatus 100 that do not include the pivoting infeed assembly.

As illustrated in dashed lines in FIG. 1 and in solid lines in FIGS. 2-5, apparatus 100 may include a liner attachment point 600. Liner attachment point 600 may be adapted, configured, designed, sized, and/or constructed to receive (or have attached thereto) a leading end 94 of flexible tube liner 90, as illustrated in FIG. 1. This may include receiving the leading end subsequent to flexible tube liner 90 (and/or leading end 94 thereof) extending through liner inlet port 210, inlet sealing structure 220, pressure chamber 200, and/or liner outlet port 230.

Liner attachment point 600 may include and/or be any suitable structure. As an example, liner attachment point 600 may include and/or be a circular, or at least substantially circular, liner attachment point 600 (i.e., may define a circular transverse cross-section). As another example, liner attachment point 600 may define a sealing surface 610. Sealing surface 610 may be adapted, configured, designed, sized, and/or constructed to form an at least partial fluid seal with flexible tube liner 90. Additionally or alternatively, sealing surface 610 also may be adapted, configured, designed, sized, and/or constructed to provide a secure attachment point for flexible tube liner 90. As an example, sealing surface 610 may be configured such that flexible tube liner 90 remains attached thereto while pressure chamber 200 is pressurized with pressurizing fluid stream 252 of FIG. 1.

As yet another example, and as illustrated in FIG. 1, liner attachment point 600 also may include a clamp 620. Clamp 620 may be configured to operatively attach, or retain, flexible tube liner 90 on liner attachment point 600 and/or on sealing surface 610 thereof. Examples of clamp 620 include any suitable circular clamp, hose clamp, ring clamp, spring clamp, t-bolt clamp, ear clamp, constant tension clamp, and/or collar.

Liner attachment point 600 may include a funnel 630, which may be configured to be operatively attached to pressure chamber 200, and pressure chamber 200 may include a flange 258 that may be shaped and/or configured to receive the funnel. Under these conditions, apparatus 100 may be configured to be utilized selectively with and/or to interface with a plurality of different funnels 630, with the different funnels 630 being configured to act as a liner attachment point 600 for different flexible tube liners 90 that may have different transverse cross-sectional shapes and/or dimensions.

Figure 3:
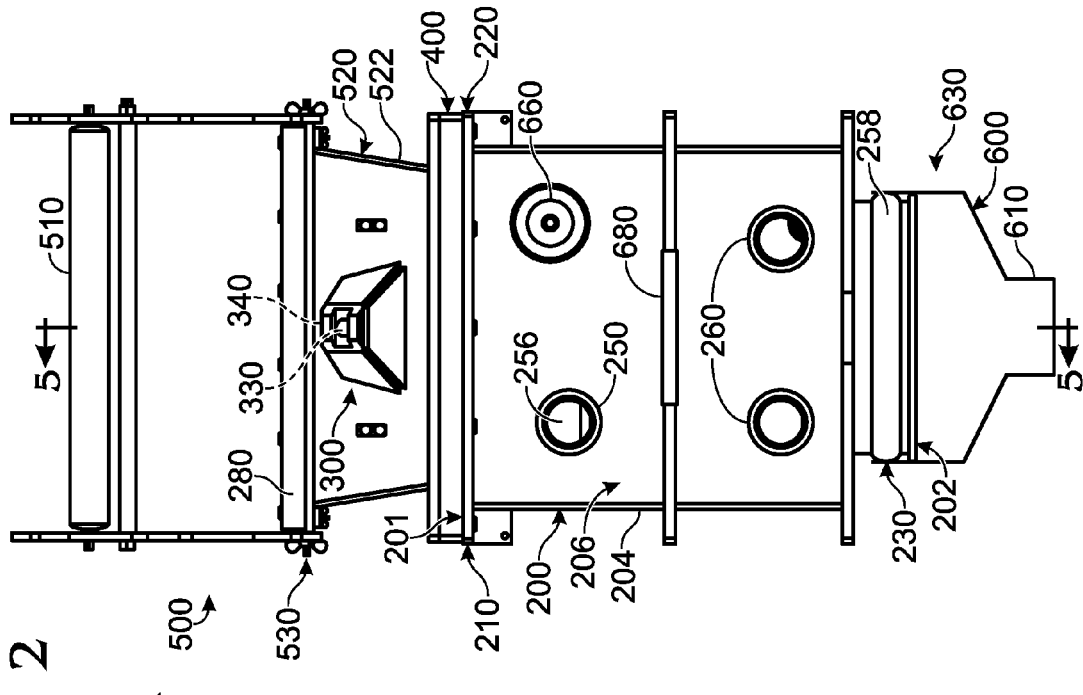
FIG. 3 is a less schematic rear view of a tubing everting apparatus according to the present disclosure.

As further illustrated in dashed lines in FIG. 1 and in solid lines in FIGS. 3-5, apparatus 100 additionally or alternatively may include at least one access port 240. Access port 240 may be configured to permit a user to access internal volume 206 of pressure chamber 200 while flexible tube liner 90 extends through the pressure chamber, as well as when the flexible tube liner does not extend through the pressure chamber. Access ports 240 may include an access port cover 242, as illustrated in FIG. 1, which may be configured to selectively permit the user to access the internal volume and/or to selectively seal the access port.

Figure 2:
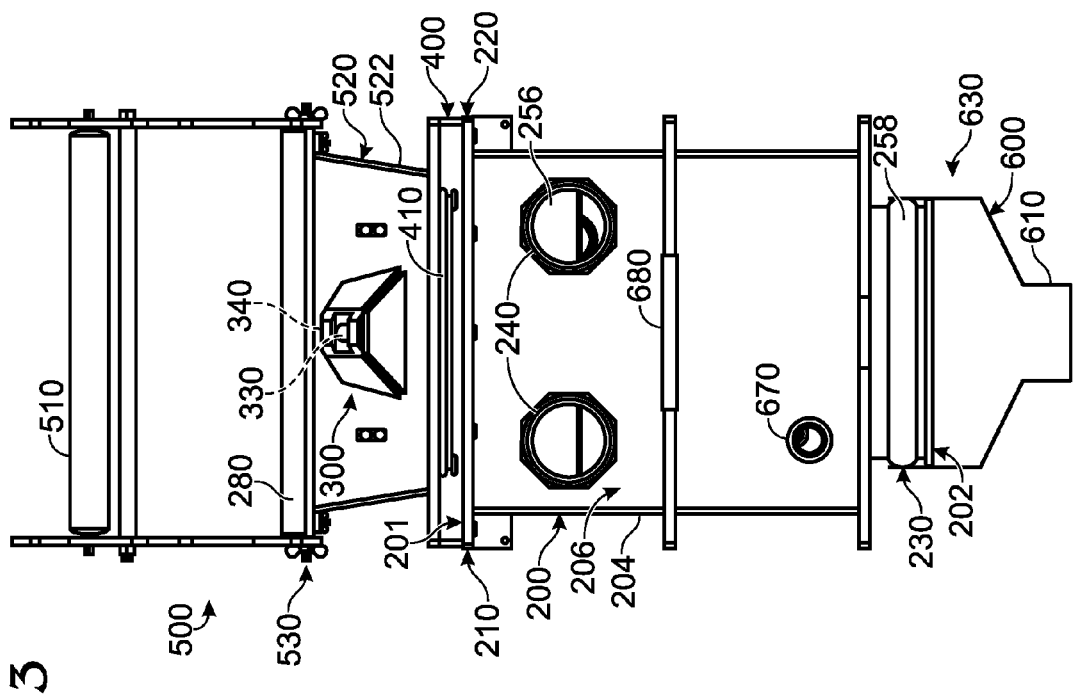
FIG. 2 is a less schematic front view of a tubing everting apparatus according to the present disclosure.

As illustrated in dashed lines in FIG. 1 and in solid lines in FIGS. 2 and 4-5, apparatus 100 additionally or alternatively may include at least one pressurizing fluid inlet port 250. Pressurizing fluid inlet port 250 may be configured to provide pressurizing fluid stream 252 to internal volume 206 of pressure chamber 200, such as to pressurize the pressure chamber, as illustrated in FIG. 1. FIG. 1 further illustrates that apparatus 100 may include a pressurizing fluid flow control valve 254, which may be configured to regulate a flow rate of the pressurizing fluid stream into the pressure chamber.

As illustrated in dashed lines in FIG. 1 and in solid lines in FIGS. 2-3 and 5, apparatus 100 and/or pressure chamber 200 thereof further may include a deflector 256. Deflector 256 may extend within internal volume 206 of pressure chamber 200 and may be configured to direct the pressurizing fluid stream downward and/or toward liner outlet port 230.

As further illustrated in dashed lines in FIG. 1 and in solid lines in FIGS. 2 and 4-5, apparatus 100 additionally or alternatively may include at least one steam inlet port 260. Steam inlet port 260 may be configured to provide steam 262 to internal volume 206 of pressure chamber 200, as illustrated in FIG. 1. This may permit the steam to heat flexible tube liner 90 subsequent to the flexible tube liner being everted by apparatus 100, thereby curing the flexible tube liner and/or at least substantially fixing a shape of the flexible tube liner. Apparatus 100 also may include a steam flow control valve 264, as illustrated in FIG. 1, which may be configured to regulate a flow rate of the steam into the pressure chamber.

As also illustrated in dashed lines in FIG. 1 and in solid lines in FIGS. 2-5, apparatus 100 may include a pressure gauge 660, a pressure relief valve 670, and/or a tie-down 680. Pressure gauge 660 may be configured to measure and/or indicate a pressure within internal volume 206 of pressure chamber 200. Pressure relief valve 670 may be configured to regulate and/or control a maximum pressure within internal volume 206 of pressure chamber 200. Tie-down 680 may be configured to permit operative attachment of apparatus 100 to an anchor, such as to restrict and/or prevent motion of apparatus 100 during operation thereof. As examples, tie-down 680 may be configured to receive a rope and/or a cable. Additionally or alternatively, tie-down 680 also may be configured for attachment of tether 98 thereto, such as to prevent tether 98 from being drawn into liner inlet port 210 by flexible tube liner 90 during operation of apparatus 100. Tie-down 680 additionally or alternatively may be referred to as a tie-down point 680.

Pressure chamber 200 may be at least partially defined by a pressure chamber body 204, and other components of apparatus 100 may be defined by and/or operatively attached to pressure chamber body 204. As an example, lubricator 300 may be operatively attached to pressure chamber body 204 and/or may be operatively attached to the pressure chamber body via infeed assembly 500. As another example, non-deflation valve 400 may extend between infeed assembly 500 and pressure chamber body 204 and/or may operatively attach infeed assembly 500 to pressure chamber body 204. As yet another example, liner attachment point 600 may be defined by and/or may be operatively attached to pressure chamber body 204.

As additional examples, access port 240, pressurizing fluid inlet port 250, and/or steam inlet port 260 may be defined by pressure chamber body 204. As still further examples, pressure gauge 660, pressure relief valve 670, and/or tie-down 680 may be operatively attached to pressure chamber body 204.

As illustrated, first side 201 of pressure chamber 200 and/or of pressure chamber body 204 thereof may be opposed to, or at least substantially opposed to, second side 202. As also illustrated, pressure chamber 200 may include and/or be a rectangular, or at least substantially rectangular, pressure chamber 200; however, this is not required.

Inlet sealing structure 220 may include and/or be any suitable structure that may be associated with liner inlet port 210 and/or that may be configured to resist fluid flow therepast, from pressure chamber 200, and/or from internal volume 206. An example of inlet sealing structure 220 is illustrated in FIG. 7, which is a less schematic cross-sectional view of a portion of tubing everting apparatus 100, including portions of lubricator 300, infeed assembly 500, non-deflation valve 400, and inlet sealing structure 220 thereof.

As illustrated in FIG. 7, inlet sealing structure 220 may include an inlet sealing plate 224 that includes and/or defines an elongate aperture 226. Elongate aperture 226, which also may be referred to herein as an aperture 226, may be sized to receive flexible tube liner 90 and/or to permit the flexible tube liner to extend therethrough.

Inlet sealing structure 220 further may include sealing lips 222, which also may be referred to herein as a pair of sealing projections 222 that includes a first sealing projection and a second sealing projection that is opposed to the first sealing projection. Sealing projections 222 may be flexible. Sealing projections 222 may extend from inlet sealing plate 224 and/or toward the internal volume of the pressure chamber and may be configured to form an at least partial fluid seal with and/or against the flexible tube liner, such as to restrict fluid flow from the internal volume via the liner inlet port. Additionally or alternatively, sealing projections 224 may extend toward one another.

As illustrated in dashed lines in FIG. 7, at least one of the pair of sealing projections 222 may include a mounting region 227, a tapered extension region 228, and a bulbous sealing region 229. Mounting region 227 may be operatively attached to inlet sealing plate 224. Bulbous region 229 may be configured to form an at least partial fluid seal with flexible tube liner 90. Tapered extension region 228 may extend between, and operatively attach, mounting region 227 and bulbous sealing region 229. Additional examples of sealing lips 222 are disclosed in the references that are incorporated by reference herein.

As discussed herein, tubing everting apparatus 100 according to the present disclosure may be configured to utilize a tether 98, which may be operatively attached to tail end 96 of the flexible tube liner. Such a tether may be abrasive in nature and/or may damage inlet sealing structure 220 should the tether be permitted to abrade the inlet sealing structure.

As such, tubing everting apparatus 100 further may include an inlet sealing structure protection device 270. Inlet sealing structure protection device 270 may be configured to prevent abrasion of the inlet sealing structure by the tether. In general, and as illustrated in FIG. 7, inlet sealing structure protection device 270 may be configured to extend between tether 98 and inlet stealing structure 220 when the tether extends within the inlet sealing structure. Stated another way, inlet sealing structure protection device 270 may be configured to limit, restrict, and/or block directly physical contact between the tether and the inlet sealing structure.

Inlet sealing structure protection device 270 may include any suitable structure and/or components. As an example, inlet sealing structure protection device 270 may include a retention structure 272, which may be configured to retain at least a portion of the inlet sealing structure protection device between the tether and the inlet sealing structure. As another example, inlet sealing structure protection device 270 may include an abrasion-resistant material, which may separate the tether from the inlet sealing structure. Examples of the abrasion-resistant material include a fabric, a cloth, a leather, and a felt.

Returning to FIG. 1, apparatus 100 further may include a liner drive mechanism 550. Liner drive mechanism 550, when present, may be configured to convey, or to provide a motive force for conveyance of, flexible tube liner 90 through pressure chamber 200, into pressure chamber 200, into liner inlet port 210 of pressure chamber 200, from pressure chamber 200, and/or from liner outlet port 230 of pressure chamber 200. Liner drive mechanism 550 may include any suitable structure.

As an example, the liner drive mechanism may include one or more rollers 560, which may rotate to convey flexible tube liner 90 through pressure chamber 200. As a more specific example, the liner drive mechanism may include a pair of opposed rollers. Examples of rollers 560 include cylindrical rollers and/or wheels that may act on and/or against flexible tube liner 90 to convey the flexible tube liner through the pressure chamber.

As another example, liner drive mechanism 550 may include one or more drive motors 570. Drive motor 570 may be operatively linked to rollers 560, when present, and may be configured to rotate the rollers. Examples of drive motor 570 include any suitable electric motor, hydraulic motor, and/or pneumatic motor. When drive motor 570 includes a pneumatic motor, the pneumatic motor may be powered by pressurizing fluid stream 252.

As also illustrated in FIG. 1, tubing everting apparatus 100 further may include and/or be utilized in combination with a pressurizing fluid source 248, such as a compressor, an air compressor, and/or a blower. Pressurizing fluid source 248, when present, may include any suitable structure that may be adapted, configured, designed, and/or constructed to provide pressurized fluid stream 252 to internal volume 206 of the pressure chamber 200. This may include providing the pressurized fluid stream via a pressurizing fluid conduit 249 that extends between the pressurizing fluid source and the pressure chamber and conveys the pressurizing fluid stream from the pressurizing fluid source to the internal volume.

It is within the scope of the present disclosure that the pressurizing fluid source may be configured to provide the pressurizing fluid stream at a flow rate of at least 2 cubic meters per minute, at least 2.5 cubic meters per minute, at least 3 cubic meters per minute, at least 4 cubic meters per minute, at least 6 cubic meters per minute, at least 8 cubic meters per minute, or at least 10 cubic meters per minute. Additionally or alternatively, the pressurizing fluid source also may be configured to provide the pressurizing fluid stream at a flow rate of at most 12 cubic meters per minute, at most 10 cubic meters per minute, at most 8 cubic meters per minute, or at most 6 cubic meters per minute.

The pressurizing fluid source also may be configured to pressurize the pressure chamber to a pressure of at least 30 kilopascals, at least 35 kilopascals, at least 40 kilopascals, at least 50 kilopascals, at least 60 kilopascals, at least 80 kilopascals, at least 100 kilopascals, or at least 120 kilopascals. Additionally or alternatively, the pressurizing fluid source may be configured to pressurize the pressure chamber to a pressure of at most 175 kilopascals, at most 150 kilopascals, at most 125 kilopascals, at most 100 kilopascals, at most 90 kilopascals, at most 80 kilopascals, at most 70 kilopascals, or at most 60 kilopascals. However, pressures of greater than 175 kilopascals also are within the scope of the present disclosure.

Tubing everting apparatus 100 and/or tubing everting assembly 80 also may include additional structures, components, functions, and/or features. Examples of such additional structures, components, functions, and/or features are disclosed in U.S. Pat. Nos. 4,064,211; 4,385,885; 4,668,125; 4,685,983; 5,154,936; 5,358,359; 5,597,353; 5,942,183; 6,390,795; 6,960,313; 7,476,348; and Re. 35,944, the complete disclosures of which are hereby incorporated by reference.

Figure 14:
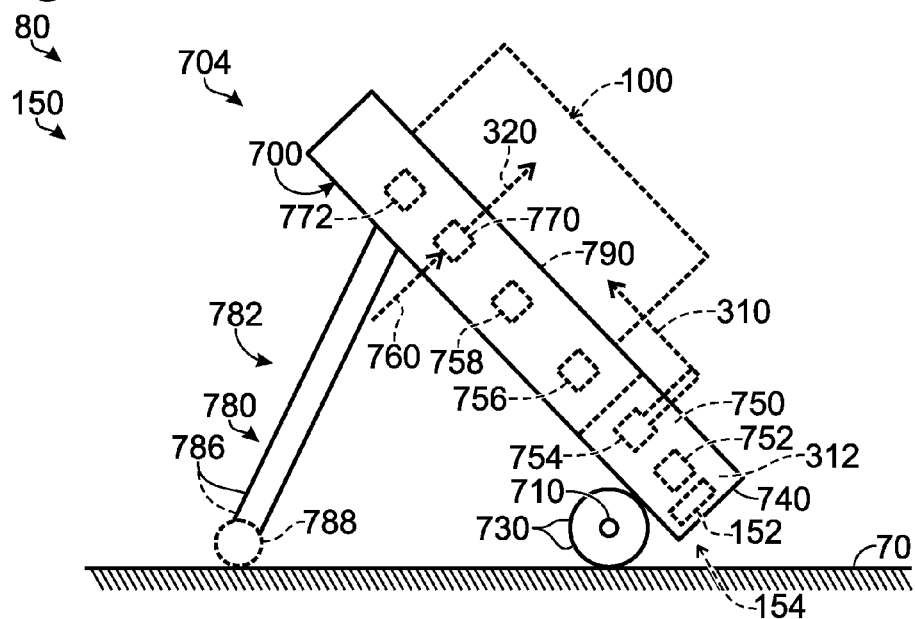
FIG. 14 is a schematic side view of a tubing everting assembly according to the present disclosure.
Figure 15:
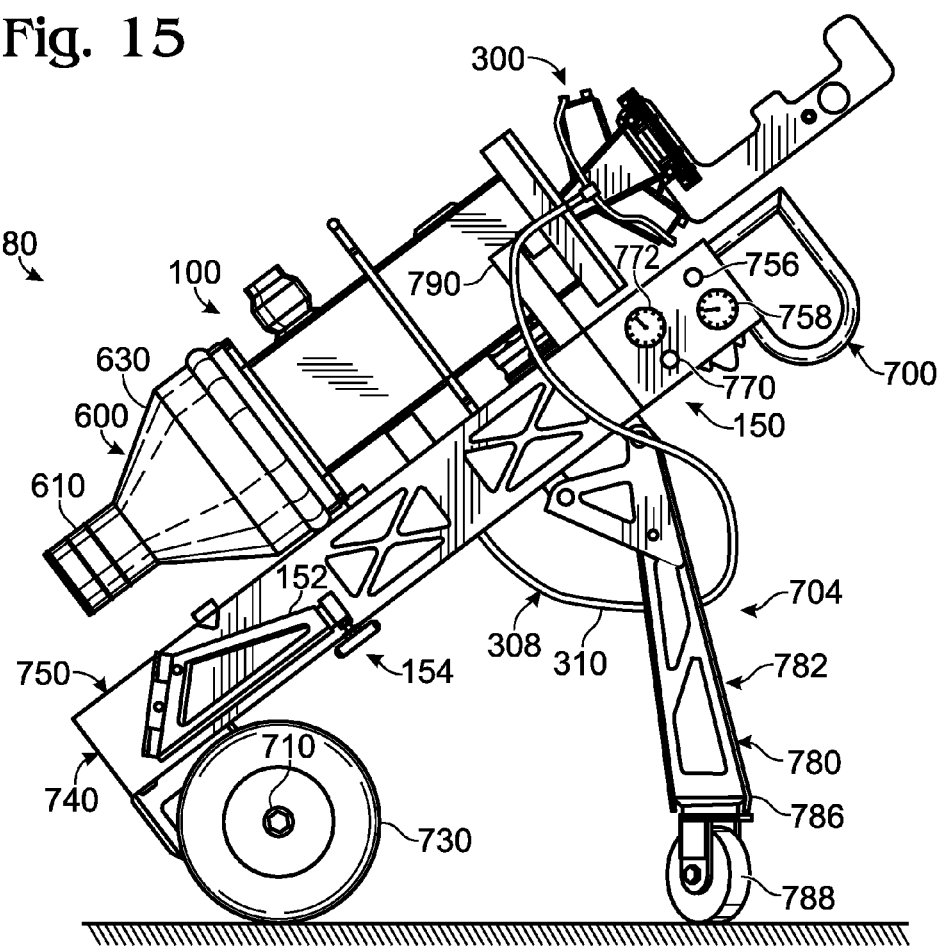
FIG. 15 is a less schematic side view of a tubing everting assembly according to the present disclosure.

FIGS. 10-14 are schematic representations of a cart 150, according to the present disclosure, while FIG. 15 is a less schematic representation of a tubing everting assembly 80 that includes both tubing everting apparatus 100 and cart 150, according to the present disclosure. Cart 150 may be operatively attached to tubing everting apparatus 100, according to the present disclosure to form tubing everting assembly 80. FIGS. 10-13 illustrate cart 150 in an upright orientation 702, while FIGS. 14-15 illustrate cart 150 in an angled orientation 704. Cart 150 additionally or alternatively may be referred to as a tubing everting apparatus conveyor 150 and/or as a wheeled transport mechanism 150.

Cart 150 may be adapted, configured, designed, and/or constructed to operatively support and transport any suitable tubing everting apparatus 100, such as tubing everting apparatus 100 of FIGS. 1-9. Apparatus 100 and cart 150 together may be referred to herein as tubing everting assembly 80.

Cart 150 includes a cart body 700, which may be operatively attached to apparatus 100. Cart 150 also may include at least one axle 710 and includes at least two wheels 730. Axle 710 may be operatively attached to cart body 700, and wheels 730 are rotatingly coupled to cart body 700, such as via axle 710.

Cart 150 is configured to be transitioned between at least upright orientation 702, as illustrated in FIGS. 10-13, and angled orientation 704, as illustrated in FIG. 14-15. Cart 150 also includes a base 740, which supports the cart on a ground surface 70, as illustrated in FIGS. 10 and 14, when the cart is in the upright orientation. In addition, wheels 730 are located such that, when the cart is in angled orientation 704 of FIGS. 14-15, the wheels operatively elevate cart body 700 and base 740 above the ground surface.

As illustrated in dashed lines in FIGS. 10 and 14 and in solid lines in FIGS. 11-13 and 15, cart 150 further may include a lubricant reservoir 750. With reference to FIGS. 10 and 14, lubricant reservoir 750 may be configured to contain a lubricant 312. Lubricant reservoir 750 also may be configured to pressurize lubricant 312 therein. As such, cart 150 and/or lubricant reservoir 750 thereof may include a pressurized air inlet 752 and a pressurized lubricant outlet 754. As illustrated, pressurized lubricant outlet 754 may be configured to provide a lubricant stream 310, in the form of a pressurized lubricant stream, to apparatus 100 and/or to a lubricator 300 thereof. Examples of lubricant 312 are disclosed herein.

Lubricant reservoir 750, when present, may be configured to house and/or contain any suitable amount, or volume, of lubricant 312. As examples, lubricant reservoir 750 may be configured to contain at least 5 liters, at least 10 liters, at least 15 liters, at least 20 liters, and/or at least 25 liters of lubricant 312. Additionally or alternatively, lubricant reservoir 750 may be configured to contain at most 50 liters, at most 40 liters, at most 30 liters, at most 25 liters, and/or at most 20 liters of lubricant 312.

Stated another way, lubricant reservoir 750 may be sized to contain a volume of lubricant 312 that is sufficient to lubricate at least a threshold length of flexible tube liner and/or to permit eversion of at least the threshold length of the flexible tube liner. The threshold length of the flexible tube liner may be at least 50 meters, at least 100 meters, at least 200 meters, at least 300 meters, and/or at least 400 meters. Additionally or alternatively, the threshold length of the flexible tube liner may be at most 600 meters, at most 500 meters, at most 400 meters, at most 300 meters, at most 200 meters, and/or at most 100 meters.

As further illustrated in dashed lines in FIGS. 10 and 14 and in solid lines in FIGS. 13 and 15, cart 150 also may include a lubricant pressure regulator 756 and/or a lubricant pressure gauge 758. Lubricant pressure regulator 756 may be configured to regulate the pressure of the pressurized lubricant stream that is delivered to lubricator 300 of apparatus 100 and/or to a component thereof, such as to atomizer 330 and/or ejector-jet pump 340 of FIGS. 1-7.

As an example, lubricant pressure regulator 756 may be configured to control a pressure of a pressurized air stream 320 that may be provided to the lubricant reservoir. Lubricant pressure gauge 758 may be configured to indicate a pressure of lubricant 312 within the lubricant reservoir and/or a pressure associated with the pressurized lubricant stream. Such a configuration may provide a user with control of a flow rate of lubricant to lubricator 300 of FIGS. 1-7 and 10.

As also illustrated in dashed lines in FIGS. 10 and 14, cart 150 may be configured to receive a source air stream 760 from an air source, such as an air compressor. In addition, cart 150 may include an air pressure regulator 770, which may be configured to regulate a pressure of the source air stream and/or to generate pressurized air stream 320 from the source air stream. Cart 150 also may include an air pressure gauge 772, which may be configured to indicate a pressure of the source air stream and/or a pressure of the pressurized air stream. At least a portion of the pressurized air stream may be provided to lubricator 300 and/or to atomizer 330 and/or ejector-jet pump 340 thereof, such as to atomize and/or entrain lubricant 312.

As further illustrated in FIGS. 10 and 12-15, cart 150 also may include a support structure 780. Support structure 780 may be configured to support the cart when the cart is in angled orientation 704, as illustrated in FIGS. 14-15.

It is within the scope of the present disclosure that support structure 780 may include and/or be a folding and/or selectively extendable support structure that may be configured to be operatively transitioned between a supporting configuration 782, as illustrated in FIGS. 12-15, and a stowed configuration 784, as illustrated in FIG. 10. When support structure 780 is in the supporting configuration, the support structure may be located to support cart 150 and/or to retain cart 150 in angled orientation 704. As illustrated in FIGS. 13-15, this may include support structure 780 extending from cart body 700 at a skew angle. Conversely, and when support structure 780 is in the stowed configuration, the support structure may not be located to support cart 150, may be at least partially stowed, and/or may be stowed, collapsed, pivoted, and/or folded near, against, and/or at least substantially parallel to cart body 700, as illustrated in FIG. 10.

Examples of support structure 780 include one or more support legs 786. As illustrated in dashed lines in FIG. 14 and in solid lines in FIGS. 11-13 and 15, support structure 780 further may include a support wheel 788. Support wheel 788 may be configured to permit cart 150 to be rolled across ground surface 70 while the cart is in angled orientation 704, as illustrated in FIG. 14. Support wheel 788 may include any suitable wheel, caster, ball, or other roller.

As illustrated in dashed lines in FIGS. 10 and 14 and in solid lines in FIGS. 11-13 and 15, cart 150 further may include one or more front supports 152. Front supports 152, when present, may be configured to support cart 150 and/or to prevent forward tipping of cart 150 when the cart is in upright orientation 702. In addition, front supports 152 may be configured to transition between a stowed configuration 154, as illustrated in FIGS. 13-15, and a deployed configuration 156, as illustrated in FIGS. 10-13. When in stowed configuration 154, front supports 152 may not support cart 150, may not prevent tipping of cart 150, and/or may not extend under apparatus 100. Conversely, and when in deployed configuration 156, front supports 152 may support cart 150, may be positioned to support cart 150, may prevent tipping of cart 150 when cart 150 is in upright orientation 702, and/or may extend at least partially under apparatus 100 and/or between apparatus 100 and ground surface 70, as illustrated in FIG. 10.

As also illustrated in dashed lines in FIGS. 10 and 14 and in solid lines in FIGS. 11-13 and 15, cart 150 may include a fastening structure 790. Fastening structure 790 may be configured to operatively attach apparatus 100 to cart body 700 and/or to restrict separation of apparatus 100 from cart body 700. Examples of fastening structure 790 include any suitable fastener, bolt, nut, washer, pin, and/or pinned receiver assembly.

FIG. 15 illustrates that tubing everting assemblies 80 that include tubing everting apparatus 100 and cart 150 further may include one or more fluid conduits interconnecting the tubing everting apparatus and the cart. As an example, a lubricant supply conduit 308 may extend between lubricant reservoir 750 and lubricator 300 and may be configured to supply lubricant stream 310 from the lubricant reservoir to the lubricator.

As discussed herein with reference to FIGS. 10 and 14, an air pressure regulator 770 may be configured to regulate a pressure of a source air stream and/or to generate a pressurized air stream, which may be provided to lubricator 300, such as to atomizer 330 and/or to ejector-jet pump 340 thereof. Air pressure gauge 772 may indicate the pressure of the source air stream and/or of the pressurized air stream. As also discussed, a lubricant pressure regulator 756 may be configured to regulate the pressure of pressurized lubricant stream 310, and lubricant pressure gauge 758 may indicate the pressure of lubricant within lubricant reservoir 750 and/or a pressure associated with the pressurized lubricant stream.

Figure 16:
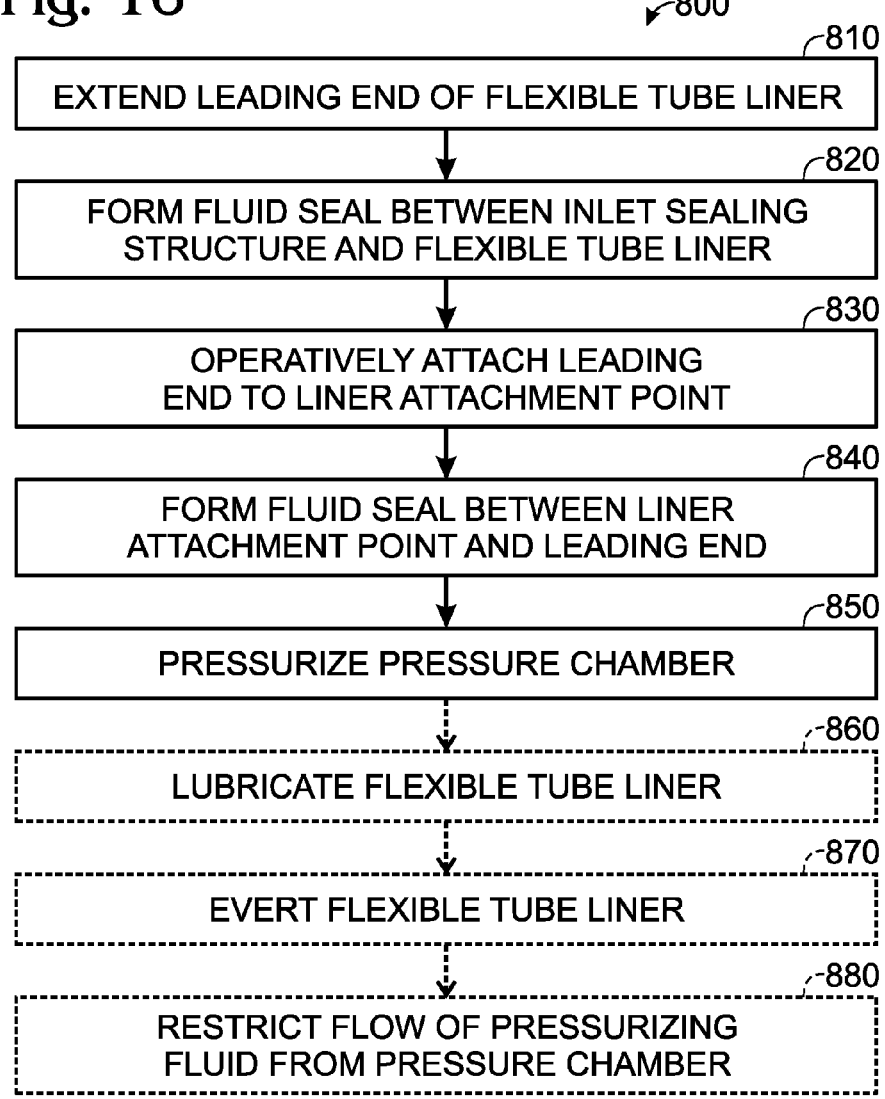
FIG. 16 is a flowchart depicting methods of operating a tubing everting apparatus, according to the present disclosure.

FIG. 16 is a flowchart depicting examples of methods 800 of operating a tubing everting apparatus 100, according to the present disclosure. Methods 800 include extending a leading end of a flexible tube liner at 810, and forming a fluid seal between an inlet sealing structure and the flexible tube liner at 820. Methods 800 further include operatively attaching the leading end to a liner attachment point at 830, forming a fluid seal between the liner attachment point and the leading end at 840, and pressurizing a pressure chamber at 850. Methods 800 further may include lubricating the flexible tube liner at 860, everting the flexible tube liner at 870, and/or restricting flow of a pressurizing fluid from the pressure chamber at 880.

Extending the leading end of the flexible tube liner at 810 may include extending the leading end through a liner inlet port of the pressure chamber of the apparatus. The extending at 810 further may include extending the leading end through an internal volume that is defined by the pressure chamber and/or extending the leading end through a liner outlet port that is defined by the pressure chamber.

Forming the fluid seal between the inlet sealing structure and the flexible tube liner at 820 may include forming an at least partial fluid seal with any suitable inlet sealing structure that may be associated with the liner inlet port. This may be accomplished in any suitable manner. As examples, the forming at 820 may include forming the fluid seal with one or more sealing lips of the inlet sealing structure, forming the fluid seal between the inlet sealing structure and a portion of the flexible tube liner that extends through the inlet sealing structure, and/or forming the fluid seal between the sealing lips and the portion of the flexible tube liner. The fluid seal may be configured to permit relative motion between the flexible tube liner and the inlet sealing structure and/or the inlet sealing structure may be configured to maintain the fluid seal despite motion of the flexible tube liner relative to the inlet sealing structure.

Operatively attaching the leading end to the liner attachment point at 830 may include operatively attaching the leading end to any suitable liner attachment point of the apparatus and may be accomplished in any suitable manner. As an example, the operatively attaching at 830 may include clamping the leading end to the liner attachment point.

Forming the fluid seal between the liner attachment point and the leading end at 840 may include forming an at least partial fluid seal in any suitable manner. As an example, the forming at 840 may include resisting fluid flow between the leading end and the liner attachment point. As another example, the forming at 840 may be a result of and/or may be responsive to the operatively attaching at 830.

Pressurizing the pressure chamber at 850 may include pressurizing the pressure chamber in any suitable manner. As an example, the pressurizing at 850 may include pressurizing with a pressurizing fluid stream, such as by supplying the pressurizing fluid stream to the pressure chamber and/or to the internal volume of the pressure chamber. As another example, the pressurizing at 850 may include pressurizing to provide a motive force for eversion of the flexible tube liner, such as during the everting at 870.

Lubricating the flexible tube liner at 860 may include lubricating with a lubricator of the apparatus. As an example, the lubricating at 860 may include lubricating with a lubricant, such as by applying the lubricant to the flexible tube liner. As another example, the lubricating at 860 may include atomizing the lubricant in the lubricator with a pressurized air stream. As yet another example, the lubricating at 860 may include applying the lubricant to the flexible tube liner prior to the flexible tube liner entering, or being drawn into, the liner inlet port of the pressure chamber.

Everting the flexible tube liner at 870 may include extending the flexible tube liner from the liner outlet port while maintaining operative attachment between the leading edge of the flexible tube liner and the liner attachment point to evert the flexible tube liner. This may include everting and/or extending responsive to and/or as a result of the pressurizing at 850. The everting at 870 further may include decreasing a length of the flexible tube liner that extends between the liner inlet port and a tail end of the flexible tube liner and/or drawing the tail end of the flexible tube liner into and/or through the liner inlet port.

Restricting flow of the pressurizing fluid from the pressure chamber at 880 may include restricting in any suitable manner and may be subsequent to the tail end of the flexible tube liner being drawn through the liner inlet port. As an example, the restricting at 880 may include restricting with a non-deflation valve. As another example, the restricting at 880 may include at least partially closing the non-deflation valve.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Examples of tubing everting apparatus, carts, assemblies, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. An apparatus for everting a flexible tube liner, the apparatus comprising:
a pressure chamber that defines an internal volume, wherein the pressure chamber is configured to be pressurized by a pressurizing fluid stream to provide a motive force for eversion of the flexible tube liner;
a liner inlet port associated with a first side of the pressure chamber and configured to receive the flexible tube liner into the internal volume;
an inlet sealing structure associated with the liner inlet port and configured to resist fluid flow therepast from the pressure chamber;
a lubricator, optionally that is operatively attached to the pressure chamber, configured to apply a lubricant to the flexible tube liner, optionally to generate a lubricated flexible tube liner, to decrease a frictional force on the flexible tube liner during eversion of the flexible tube liner; and
a liner outlet port associated with a second side of the pressure chamber and configured to permit the flexible tube liner to extend from the internal volume.

A2. The apparatus of paragraph A1, wherein the lubricator includes an atomizer configured to atomize the lubricant prior to application of the lubricant to the flexible tube liner.

A3. The apparatus of paragraph A2, wherein the atomizer includes a lubricant inlet and a pressurized air inlet, wherein the lubricant inlet is configured to receive a lubricant stream, wherein the pressurized air inlet is configured to receive a pressurized air stream, and further wherein the atomizer is configured to atomize the lubricant stream with the pressurized air stream to generate an atomized lubricant stream and to apply the atomized lubricant stream to the flexible tube liner.

A4. The apparatus of paragraph A1, wherein the lubricator includes an ejector-jet pump that includes a lubricant inlet and a pressurized air inlet, wherein the lubricant inlet is configured to receive a lubricant stream, wherein the pressurized air inlet is configured to receive a pressurized air stream, and further wherein the ejector-jet pump is configured to entrain the lubricant in the pressurized air stream to generate an entrained lubricant stream and to apply the entrained lubricant stream to the flexible tube liner.

A5. The apparatus of any of paragraphs A1-A4, in combination with a lubricant source configured to provide a/the lubricant stream to the lubricator.

A6. The apparatus of any of paragraphs A1-A5, in combination with a pressurized air source configured to provide a/the pressurized air stream to the lubricator.

A7. The apparatus of any of paragraphs A1-A6, wherein the lubricator includes a plurality of nozzles configured to apply a plurality of lubricant streams to the flexible tube liner.

A8. The apparatus of any of paragraphs A1-A7, wherein the lubricator is configured to apply the lubricant to the flexible tube liner prior to the flexible tube liner being received into the pressure chamber via the liner inlet port.

A9. The apparatus of any of paragraphs A1-A8, wherein the lubricator is configured to apply the lubricant to the flexible tube liner prior to the flexible tube liner being received into the pressure chamber via the inlet sealing structure.

A10. The apparatus of any of paragraphs A1-A9, wherein the lubricator is configured to apply the lubricant to an external surface of the flexible tube liner prior to eversion of the flexible tube liner.

A11. The apparatus of any of paragraphs A1-A10, wherein the lubricator includes a nozzle, and further wherein, during eversion of the flexible tube liner, the nozzle is spaced apart from the flexible tube liner by a threshold spray distance, optionally wherein the threshold spray distance is at least 1 cm, at least 2 cm, at least 3 cm, at least 4 cm, at least 6 cm, at least 8 cm, or at least 10 cm, and further wherein the threshold spray distance is less than 20 cm, less than 18 cm, less than 16 cm, less than 14 cm, less than 12 cm, or less than 10 cm.

A12. The apparatus of any of paragraphs A1-A11, wherein the apparatus further includes a non-deflation valve that is spaced-apart from the inlet sealing structure and configured to selectively transition between an open state, in which the non-deflation valve permits the flexible tube liner to pass through the liner inlet port, and a closed state, in which the non-deflation valve restricts flow of the pressurizing fluid stream from the pressure chamber, via the liner inlet port, when the pressure chamber is pressurized by the pressurizing fluid stream and a tail end of the flexible tube liner has passed through the liner inlet port.

B1. An apparatus for everting a flexible tube liner, the apparatus comprising:
a pressure chamber that defines an internal volume, wherein the pressure chamber is configured to be pressurized by a pressurizing fluid stream to provide a motive force for eversion of the flexible tube liner;
a liner inlet port associated with a first side of the pressure chamber and configured to receive the flexible tube liner into the internal volume;
an inlet sealing structure associated with the liner inlet port and configured to resist fluid flow therepast from the pressure chamber;
a non-deflation valve that is spaced-apart from the inlet sealing structure and configured to selectively transition between an open state, in which the non-deflation valve permits the flexible tube liner to pass through the liner inlet port, and a closed state, in which the non-deflation valve restricts flow of the pressurizing fluid stream from the pressure chamber, via the liner inlet port, when the pressure chamber is pressurized by the pressurizing fluid stream and a tail end of the flexible tube liner has passed through the liner inlet port; and
a liner outlet port associated with a second side of the pressure chamber and configured to permit the flexible tube liner to extend from the internal volume.

C1. The apparatus of any of paragraphs A12-B1, wherein the non-deflation valve includes at least one of a plate valve, a knife valve, and a flapper valve.

C2. The apparatus of any of paragraphs A12-C1, wherein the non-deflation valve is a manually actuated non-deflation valve, optionally wherein the non-deflation valve includes a handle configured to be grasped by a user to transition the non-deflation valve between the open state and the closed state, and further optionally wherein the non-deflation valve includes a sliding valve plate, which is actuated via the handle, to transition the non-deflation valve between the open state and the closed state.

C3. The apparatus of any of paragraphs A12-C2, wherein the non-deflation valve is an automatically actuated non-deflation valve, optionally wherein the presence of the flexible tube liner, within the non-deflation valve, maintains the non-deflation valve in the open state, and further optionally wherein a pressure force, which is generated by the pressurizing fluid stream, transitions the non-deflation valve from the open state to the closed state when the flexible tube liner is not present within the non-deflation valve.

C4. The apparatus of paragraph C3, wherein the automatically actuated non-deflation valve automatically transitions from the open state to the closed state responsive to the pressurizing fluid stream pressurizing the pressure chamber and the tail end of the flexible tube liner passing through the automatically actuated non-deflation valve.

C5. The apparatus of any of paragraphs A12-C4, wherein the non-deflation valve is located between a/the lubricator of the apparatus and the liner inlet port.

C6. The apparatus of any of paragraphs A12-C5, wherein the non-deflation valve includes a recess sized to permit a tether, which is attached to the tail end of the flexible tube liner, to extend therethrough while the non-deflation valve is in the closed state.

C7. The apparatus of any of paragraphs A12-C6, wherein, when the non-deflation valve is in the open state, the non-deflation valve defines a first cross-sectional area for fluid flow therethrough, wherein, when the non-deflation valve is in the closed state, the non-deflation valve defines a second cross-sectional area for fluid flow therethrough, and further wherein the first cross-sectional area is greater than the second cross-sectional area.

C8. The apparatus of any of paragraphs A12-C7, wherein at least a portion of the non-deflation valve is configured to at least one of:
(i) pivot when the non-deflation valve transitions between the open state and the closed state;
(ii) slide when the non-deflation valve transitions between the open state and the closed state; and (iii) deform when the non-deflation valve transitions between the open state and the closed state.

C9. The apparatus of any of paragraphs A12-C8, wherein the inlet sealing structure extends between the liner inlet port and the non-deflation valve.

C10. The apparatus of any of paragraphs A1-C9, wherein the inlet sealing structure includes an inlet sealing plate that defines an elongate aperture, which is sized to receive the flexible tube liner.

C11. The apparatus of paragraph C10, wherein the inlet sealing structure further includes a pair of sealing projections extending from the inlet sealing plate and configured to form an at least partial fluid seal against the flexible tube liner to restrict fluid flow from the internal volume via the liner inlet port.

C12. The apparatus of paragraph C11, wherein each of the pair of sealing projections includes a first sealing projection and a second sealing projection that is opposed to the first sealing projection.

C13. The apparatus of paragraph C12, wherein the first sealing projection and the second sealing projection extend toward one another.

C14. The apparatus of any of paragraphs C11-C13, wherein each of the pair of sealing projections is flexible.

C15. The apparatus of any of paragraphs C11-C14, wherein at least one of the pair of sealing projections includes a mounting region, which is operatively attached to the inlet sealing plate, a bulbous sealing region, which is configured to form an at least partial fluid seal with the flexible tube liner, and a tapered extension region, which extends between the mounting region and the bulbous sealing region.

C16. The apparatus of any of paragraphs C11-C15, wherein the pair of sealing projections extends from the inlet sealing plate and toward the internal volume of the pressure chamber.

C17. The apparatus of any of paragraphs A1-C16, wherein the apparatus further includes an inlet sealing structure protection device configured to prevent abrasion of the inlet sealing structure by a/the tether, which is attached to a/the tail end of the flexible tube liner, when the tail end of the flexible tube liner has passed through the inlet sealing structure and the tether extends within the inlet sealing structure.

C18. The apparatus of paragraph C17, wherein the inlet sealing structure protection device is configured to extend between the tether and the inlet sealing structure when the tether extends within the inlet sealing structure.

C19. The apparatus of any of paragraphs C17-C18, wherein the inlet sealing structure protection device is formed from at least one of a fabric, a cloth, a leather, and a felt.

C20. The apparatus of any of paragraphs C17-C19, wherein the inlet sealing structure protection device includes a retention structure configured to retain at least a portion of the inlet sealing structure protection device between the tether and the inlet sealing structure while the tether passes through the inlet sealing structure.

C21. The apparatus of any of paragraphs A1-C20, wherein the apparatus further includes a deflector, wherein the deflector extends within the internal volume of the pressure chamber and directs the pressurizing fluid stream toward the liner outlet port.

C22. The apparatus of any of paragraphs A1-C21, wherein the apparatus further includes a liner attachment point for a leading end of the flexible tube liner.

C23. The apparatus of paragraph C22, wherein the liner attachment point is configured to receive the flexible tube liner subsequent to the flexible tube liner extending through the liner inlet port, the inlet sealing structure, the pressure chamber, and the liner outlet port.

C24. The apparatus of any of paragraphs C22-C23, wherein the liner attachment point includes an at least substantially circular liner attachment point.

C25. The apparatus of any of paragraphs C22-C24, wherein the liner attachment point defines a sealing surface configured to form an at least partial fluid seal with the flexible tube liner.

C26. The apparatus of any of paragraphs C22-C25, wherein the apparatus further includes a clamp configured to operatively attach the flexible tube liner to the liner attachment point.

C27. The apparatus of any of paragraphs C22-C26, wherein the apparatus further includes a funnel, wherein the funnel is configured to be operatively attached to the pressure chamber and defines the liner attachment point. C28. The apparatus of paragraph C27, wherein the pressure chamber includes a flange that is shaped to receive the funnel.

C29. The apparatus of any of paragraphs A1-C28, wherein the apparatus further includes an infeed assembly configured to direct the flexible tube liner into the liner inlet port.

C30. The apparatus of paragraph C29, wherein the infeed assembly includes an infeed roller.

C31. The apparatus of any of paragraphs C29-C30, wherein the infeed assembly includes a tapered region.

C32. The apparatus of paragraph C31, wherein the tapered region includes a pair of opposed planar surfaces oriented at a skew angle relative to one another such that a distance between the pair of opposed planar surfaces at a side that is proximal the liner inlet port is less than a distance between the pair of opposed planar surfaces at a side that is distal the liner inlet port.

C33. The apparatus of any of paragraphs C29-C32, wherein the infeed assembly is a pivoting infeed assembly configured to operatively pivot relative to the pressure chamber about a pivot point.

C34. The apparatus of paragraph C33, wherein the infeed assembly is configured to operatively pivot between a directing configuration, in which the infeed assembly is oriented to direct the flexible tube liner into the liner inlet port and that defines an in-use height of the apparatus, and a storage configuration, which defines a storage height of the apparatus, wherein the storage height is less than the in-use height.

C35. The apparatus of any of paragraphs A1-C34, wherein the apparatus further includes at least one access port configured to permit user access to the internal volume of the pressure chamber while the flexible tube liner extends through the pressure chamber.

C36. The apparatus of paragraph C35, wherein the at least one access port includes a cover configured to selectively permit a user to access the internal volume.

C37. The apparatus of any of paragraphs A1-C36, wherein the apparatus further includes at least one pressurizing fluid inlet port configured to receive the pressurizing fluid stream and to provide the pressurizing fluid stream to the pressure chamber.

C38. The apparatus of paragraph C37, wherein the apparatus further includes at least one pressurizing fluid flow control valve configured to regulate flow of the pressurizing fluid stream into the pressure chamber.

C39. The apparatus of any of paragraphs A1-C38, wherein the apparatus further includes at least one steam inlet port configured to provide steam to the pressure chamber.

C40. The apparatus of paragraph C39, wherein the apparatus further includes at least one steam flow control valve configured to regulate a flow rate of the steam into the pressure chamber.

C41. The apparatus of any of paragraphs A1-C40, wherein the apparatus further includes a pressure gauge configured to indicate a pressure within the internal volume of the pressure chamber.

C42. The apparatus of any of paragraphs A1-C41, wherein the apparatus further includes a pressure relief valve configured to regulate a maximum pressure within the internal volume of the pressure chamber.

C43. The apparatus of any of paragraphs A1-C42, wherein the apparatus further includes a tie-down configured to permit operative attachment of the apparatus to an anchor.

C44. The apparatus of any of paragraphs A1-C43, wherein the pressure chamber is defined by a pressure chamber body.

C45. The apparatus of paragraph C44, wherein a/the lubricator is operatively attached to the pressure chamber body, optionally via a/the infeed assembly.

C46. The apparatus of any of paragraphs C45-C46, wherein a/the non-deflation valve extends between a/the infeed assembly and the pressure chamber body.

C47. The apparatus of any of paragraphs C44-C46, wherein a/the liner attachment point is defined by the pressure chamber body.

C48. The apparatus of any of paragraphs C44-C47, wherein a/the liner attachment point is operatively attached to the pressure chamber body.

C49. The apparatus of any of paragraphs C44-C48, wherein a/the access port is defined by the pressure chamber body.

C50. The apparatus of any of paragraphs C44-C49, wherein a/the pressurizing fluid inlet port is defined by the pressure chamber body.

C51. The apparatus of any of paragraphs C44-C50, wherein a/the steam inlet port is defined by the pressure chamber body.

C52. The apparatus of any of paragraphs C44-C51, wherein a/the pressure gauge is operatively attached to the pressure chamber body.

C53. The apparatus of any of paragraphs C44-C52, wherein a/the pressure relief valve is operatively attached to the pressure chamber body.

C54. The apparatus of any of paragraphs C44-C53, wherein a/the tie-down is operatively attached, and optionally permanently attached, to the pressure chamber body.

C55. The apparatus of any of paragraphs A1-C54, wherein the first side of the pressure chamber is opposed to the second side of the pressure chamber.

C56. The apparatus of any of paragraphs A1-C55, wherein the pressure chamber is a rectangular pressure chamber.

C57. The apparatus of any of paragraphs A1-C56, wherein the apparatus includes the flexible tube liner.

C58. The apparatus of paragraph C57, wherein the flexible tube liner is sized to line a tube with an inside diameter of at least one of:
(i) at least 10 cm, at least 15 cm, at least 20 cm, at least 25 cm, at least 30 cm, at least 35 cm, at least 40 cm, at least 50 cm, or at least 60 cm; and
(ii) at most 100 cm, at most 90 cm, at most 80 cm, at most 70 cm, at most 60 cm, at most 50 cm, at most 40 cm, or at most 30 cm.

C59. The apparatus of any of paragraphs A1-C58, wherein the apparatus further includes a pressurizing fluid source configured to provide the pressurizing fluid stream to the internal volume of the pressure chamber.

C60. The apparatus of paragraph C59, wherein the apparatus further includes a pressurizing fluid conduit that extends between the pressurizing fluid source and the pressure chamber and conveys the pressurizing fluid stream between the pressurizing fluid source and the internal volume.

C61. The apparatus of any of paragraphs C59-C60, wherein the pressurizing fluid source is configured to provide the pressurizing fluid stream at a flow rate of at least one of:
(i) at least 2 cubic meters per minute, at least 2.5 cubic meters per minute, at least 3 cubic meters per minute, at least 4 cubic meters per minute, at least 6 cubic meters per minute, at least 8 cubic meters per minute, or at least 10 cubic meters per minute; and
(ii) at most 12 cubic meters per minute, at most 10 cubic meters per minute, at most 8 cubic meters per minute, or at most 6 cubic meters per minute.

C62. The apparatus of any of paragraphs C59-C61, wherein the pressurizing fluid source is configured to pressurize the pressure chamber, with the pressurizing fluid stream, to a pressure of at least one of:
(i) at least 30 kilopascals, at least 35 kilopascals, at least 40 kilopascals, at least 50 kilopascals, at least 60 kilopascals, at least 80 kilopascals, at least 100 kilopascals, or at least 120 kilopascals; and
(ii) at most 175 kilopascals, at most 150 kilopascals, at most 125 kilopascals, at most 100 kilopascals, at most 90 kilopascals, at most 80 kilopascals, at most 70 kilopascals, or at most 60 kilopascals.

D1. A cart for an apparatus for everting a flexible tube liner, the cart comprising:
a cart body configured to be operatively attached to the apparatus;
optionally at least one axle operatively attached to the cart body;
at least two wheels rotatingly coupled to the cart body, wherein the cart is configured to be transitioned between at least an upright orientation and an angled orientation; and
a base configured to support the cart on a ground surface when the cart is in the upright orientation, wherein the at least two wheels are located such that, when the cart is in the angled orientation, the wheels operatively elevate the cart body and the base above the ground surface.

D2. The cart of paragraph D1, wherein the cart further includes a lubricant reservoir configured to contain a lubricant.

D3. The cart of paragraph D2, wherein the lubricant reservoir includes a pressurized air inlet and a pressurized lubricant outlet, wherein the pressurized air inlet is configured to receive a pressurized air stream to pressurize the lubricant, and further wherein the pressurized lubricant outlet is configured to provide a pressurized lubricant stream to the apparatus.

D4. The cart of paragraph D3, wherein the cart further includes a lubricant pressure regulator configured to regulate a pressure of the pressurized lubricant stream, optionally by regulating a pressure of the pressurized air stream that is provided to the lubricant reservoir.

D5. The cart of any of paragraphs D2-D4, wherein the cart further includes a lubricant pressure gauge configured to indicate at least one of a pressure within the lubricant reservoir and a pressure associated with the pressurized lubricant stream.

D6. The cart of any of paragraphs D2-D5, wherein the lubricant reservoir has a volume of at least one of:
(i) at least 5 liters, at least 10 liters, at least 15 liters, at least 20 liters, or at least 25 liters; and
(ii) at most 50 liters, at most 40 liters, at most 30 liters, at most 25 liters, or at most 20 liters.

D7. The cart of any of paragraphs D2-D6, wherein the lubricant reservoir is sized to contain a volume of lubricant sufficient to permit eversion of at least a threshold length of the flexible tube liner.

D8. The cart of paragraph D7, wherein the threshold length of the flexible tube liner is at least one of:
(i) at least 50 meters, at least 100 meters, at least 200 meters, at least 300 meters, or at least 400 meters; and
(ii) at most 600 meters, at most 500 meters, at most 400 meters, at most 300 meters, at most 200 meters, or at most 100 meters.

D9. The cart of any of paragraphs D2-D8, wherein the cart includes the lubricant, and optionally wherein the lubricant includes at least one of an oil, a mineral oil, a vegetable oil, a peanut oil, a surfactant, an aqueous surfactant solution, soap, and soapy water.

D10. The cart of any of paragraphs D1-D9, wherein the cart is configured to receive a source air stream from an air source.

D11. The cart of paragraph D10, wherein the cart further includes an air pressure regulator configured to regulate a pressure of the source air stream to generate a/the pressurized air stream.

D12. The cart of any of paragraphs D10-D11, wherein the cart further includes an air pressure gauge configured to indicate at least one of a/the pressure of the source air stream and a pressure of a/the pressurized air stream.

D13. The cart of any of paragraphs D10-D12, wherein the cart further is configured to provide at least a portion of the source air stream to a lubricator of the apparatus as a/the pressurized air stream.

D14. The cart of any of paragraphs D1-D13, wherein the cart further includes a support structure configured to support the cart when the cart is in the angled orientation.

D15. The cart of paragraph D14, wherein the support structure is a folding support structure configured to be operatively transitioned between a supporting configuration, wherein the support structure is located to operatively support the cart when the cart is in the angled orientation, and a stowed configuration, wherein the support structure is at least partially stowed.

D16. The cart of any of paragraphs D14-D15, wherein the support structure extends from the cart body at a skew angle when a/the folding support structure is in a/the supporting configuration.

D17. The cart of any of paragraphs D14-D16, wherein the support structure includes a support leg.

D18. The cart of any of paragraphs D14-D17, wherein the support structure further includes at least one support wheel configured to permit the cart to be rolled across the ground surface while the cart is in the angled orientation.

D19. The cart of any of paragraphs D1-D18, wherein the cart further includes a fastening structure configured to operatively attach the cart body to the apparatus.

D20. A tubing everting assembly, comprising:
the apparatus of any of paragraphs A1-C62; and
the cart of any of paragraphs D1-D19, wherein the apparatus is operatively attached to the cart, and further wherein the cart is configured to provide a/the pressurized lubricant stream and a/the pressurized air stream to a/the lubricator of the apparatus.

E1. A method of operating an apparatus for everting a flexible tube liner, the method comprising:
extending a leading end of the flexible tube liner through a liner inlet port of a pressure chamber of the apparatus, through an internal volume defined by the pressure chamber, and through a liner outlet port defined by the pressure chamber;
forming an at least partial fluid seal between an inlet sealing structure that is associated with the liner inlet port of the pressure chamber and a portion of the flexible tube liner that extends therethrough;
operatively attaching the leading end of the flexible tube liner to a liner attachment point of the apparatus;
forming an at least partial fluid seal between the leading end of the flexible tube liner and the liner attachment point; and
pressurizing the pressure chamber with a pressurizing fluid stream to provide a motive force for eversion of the flexible tube liner.

E2. The method of paragraph E1, wherein the method further includes lubricating the flexible tube liner with a lubricator of the apparatus.

E3. The method of paragraph E2, wherein the lubricating includes lubricating with a lubricant.

E4. The method of paragraph E3, wherein the lubricating includes atomizing the lubricant in the lubricator with a pressurized air stream.

E5. The method of any of paragraphs E3-E4, wherein the lubricating includes applying the lubricant to the flexible tube liner prior to the flexible tube liner entering the liner inlet port.

E6. The method of any of paragraphs E1-E5, wherein the method further includes everting the flexible tube liner by extending the flexible tube liner from the liner outlet port.

E7. The method of paragraph E6, wherein the everting includes drawing a tail end of the flexible tube liner through the liner inlet port.

E8. The method of paragraph E7, wherein, subsequent to the drawing, the method further includes restricting flow of the pressurizing fluid stream from the pressure chamber and via the liner inlet port with a non-deflation valve.

E9. The method of paragraph E8, wherein the restricting includes at least partially closing the non-deflation valve.

E10. The method of any of paragraphs E1-E9, wherein the method further includes supporting the apparatus with the cart of any of paragraphs D1-D19.

E11. The method of any of paragraphs E1-E10, wherein the apparatus includes the apparatus of any of paragraphs A1-C62.

INDUSTRIAL APPLICABILITY

The apparatus, assemblies, and methods disclosed herein are applicable to the tubular lining, tubing everting, and/or plumbing industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An apparatus for everting a flexible tube liner, the apparatus comprising:
   a pressure chamber that defines an internal volume, wherein the pressure chamber is configured to be pressurized by a pressurizing fluid stream to provide a motive force for eversion of the flexible tube liner;
   a liner inlet port associated with a first side of the pressure chamber and configured to receive the flexible tube liner into the internal volume;
   an inlet sealing structure associated with the liner inlet port and configured to resist fluid flow therepast from the pressure chamber, wherein the inlet sealing structure includes a pair of opposed sealing lips configured to press against opposed sides of the flexible tube liner to form an at least partial fluid seal with the flexible tube liner;
   a lubricator that is operatively attached to the pressure chamber and configured to apply a lubricant to the flexible tube liner to decrease a frictional force on the flexible tube liner during eversion of the flexible tube liner, wherein the lubricator:
     (i) includes an atomizer configured to atomize the lubricant prior to application of the lubricant to the flexible tube liner;
     (ii) is external to the pressure chamber; and
     (iii) is configured to apply the lubricant to the flexible tube liner prior to the flexible tube liner being received into the pressure chamber via the liner inlet port and the inlet sealing structure; and
   a liner outlet port associated with a second side of the pressure chamber and configured to permit the flexible tube liner to extend from the internal volume.

2. The apparatus of claim 1, wherein the atomizer includes a lubricant inlet and a pressurized air inlet, wherein the lubricant inlet is configured to receive a lubricant stream, wherein the pressurized air inlet is configured to receive a pressurized air stream, and further wherein the atomizer is configured to atomize the lubricant stream with the pressurized air stream to generate an atomized lubricant stream and to apply the atomized lubricant stream to the flexible tube liner.

3. The apparatus of claim 2, in combination with a lubricant source configured to provide the lubricant stream to the lubricator.

4. The apparatus of claim 3, in combination with a pressurized air source configured to provide the pressurized air stream to the lubricator.

5. The apparatus of claim 1, wherein the lubricator includes an ejector-jet pump that includes a lubricant inlet and a pressurized air inlet, wherein the lubricant inlet is configured to receive a lubricant stream, wherein the pressurized air inlet is configured to receive a pressurized air stream, and further wherein the ejector-jet pump is configured to entrain the lubricant in the pressurized air stream to generate an entrained lubricant stream and to apply the entrained lubricant stream to the flexible tube liner.

6. The apparatus of claim 1, wherein the lubricator includes a plurality of nozzles configured to apply a plurality of lubricant streams to the flexible tube liner.

7. The apparatus of claim 1, wherein the lubricator is configured to apply the lubricant to an external surface of the flexible tube liner prior to eversion of the flexible tube liner.

8. The apparatus of claim 1, wherein the apparatus further includes a non-deflation valve that is spaced-apart from the inlet sealing structure and configured to selectively transition between an open state, in which the non-deflation valve permits the flexible tube liner to pass through the liner inlet port, and a closed state, in which the non-deflation valve restricts flow of the pressurizing fluid stream from the pressure chamber, via the liner inlet port, when the pressure chamber is pressurized by the pressurizing fluid stream and a tail end of the flexible tube liner has passed through the liner inlet port; and further wherein the non-deflation valve is configured to at least one of slide, pivot, and deform during transitioning between the open state and the closed state.

9. The apparatus of claim 1, wherein the apparatus further includes an inlet sealing structure protection device configured to prevent abrasion of the inlet sealing structure by a tether, which is attached to a tail end of the flexible tube liner, when the tail end of the flexible tube liner has passed through the inlet sealing structure and the tether extends within the inlet sealing structure.

10. The apparatus of claim 9, wherein the inlet sealing structure protection device is configured to extend between the tether and the inlet sealing structure when the tether extends within the inlet sealing structure.

11. The apparatus of claim 1, wherein the apparatus further includes a liner attachment point for a leading end of the flexible tube liner.

12. A tubing everting assembly, comprising:
   the apparatus of claim 1; and
   a cart, wherein the apparatus is operatively attached to the cart, wherein the cart is configured to provide a pressurized lubricant stream and a pressurized air stream to the lubricator of the apparatus, the cart comprising:
     (i) a cart body configured to be operatively attached to the apparatus;
     (ii) at least two wheels rotatingly coupled to the cart body, wherein the cart is configured to be transitioned between at least an upright orientation and an angled orientation;
     (iii) a base configured to support the cart on a ground surface when the cart is in the upright orientation, wherein the at least two wheels are located such that, when the cart is in the angled orientation, the wheels operatively elevate the cart body and the base above the ground surface; and
     (iv) a lubricant reservoir configured to contain a lubricant that comprises the pressurized lubricant stream.

13. An apparatus for everting a flexible tube liner, the apparatus comprising:
- a pressure chamber that defines an internal volume, wherein the pressure chamber is configured to be pressurized by a pressurizing fluid stream to provide a motive force for eversion of the flexible tube liner;
- a liner inlet port associated with a first side of the pressure chamber and configured to receive the flexible tube liner into the internal volume;
- an inlet sealing structure associated with the liner inlet port and configured to resist fluid flow therepast from the pressure chamber;
- a non-deflation valve that is spaced-apart from the inlet sealing structure and configured to selectively transition between an open state, in which the non-deflation valve permits the flexible tube liner to pass through the liner inlet port, and a closed state, in which the non-deflation valve restricts flow of the pressurizing fluid stream from the pressure chamber, via the liner inlet port, when the pressure chamber is pressurized by the pressurizing fluid stream and a tail end of the flexible tube liner has passed through the liner inlet port; wherein the non-deflation valve is configured to at least one of slide, pivot, and deform during transitioning between the open state and the closed state; and
- a liner outlet port associated with a second side of the pressure chamber and configured to permit the flexible tube liner to extend from the internal volume.

14. The apparatus of claim 13, wherein the non-deflation valve includes at least one of a plate valve, a knife valve, and a flapper valve.

15. The apparatus of claim 13, wherein the non-deflation valve is a manually actuated non-deflation valve that includes a handle configured to be grasped by a user to transition the non-deflation valve between the open state and the closed state.

16. The apparatus of claim 13, wherein the non-deflation valve includes a recess sized to permit a tether, which is attached to the tail end of the flexible tube liner, to extend therethrough while the non-deflation valve is in the closed state.

17. The apparatus of claim 13, wherein at least a portion of the non-deflation valve is configured to at least one of:
- (i) pivot when the non-deflation valve transitions between the open state and the closed state;
- (ii) slide when the non-deflation valve transitions between the open state and the closed state; and
- (iii) deform when the non-deflation valve transitions between the open state and the closed state.

18. The apparatus of claim 13, wherein the apparatus further includes an inlet sealing structure protection device configured to prevent abrasion of the inlet sealing structure by a tether, which is attached to the tail end of the flexible tube liner, when the tail end of the flexible tube liner has passed through the inlet sealing structure and the tether extends within the inlet sealing structure.

19. The apparatus of claim 18, wherein the inlet sealing structure protection device is configured to extend between the tether and the inlet sealing structure when the tether extends within the inlet sealing structure.

20. The apparatus of claim 13, wherein the apparatus further includes a liner attachment point for a leading end of the flexible tube liner.

21. A method of operating an apparatus for everting a flexible tube liner, the method comprising:
- extending a leading end of the flexible tube liner through a liner inlet port of a pressure chamber of the apparatus, through an internal volume defined by the pressure chamber, and through a liner outlet port defined by the pressure chamber;
- forming an at least partial fluid seal between an inlet sealing structure that is associated with the liner inlet port of the pressure chamber and a portion of the flexible tube liner that extends therethrough, wherein the inlet sealing structure includes a pair of opposed sealing lips, and further wherein the forming the at least partial fluid seal includes pressing the pair of opposed sealing lips against opposed sides of the flexible tube liner;
- operatively attaching the leading end of the flexible tube liner to a liner attachment point of the apparatus;
- forming an at least partial fluid seal between the leading end of the flexible tube liner and the liner attachment point;
- lubricating the flexible tube liner with a lubricator of the apparatus, wherein the lubricator includes an atomizer configured to atomize a lubricant prior to application of the lubricant to the flexible tube liner, and further wherein the lubricating includes spraying atomized lubricant on the flexible tube liner prior to the flexible tube liner being received into the pressure chamber via the liner inlet port and the inlet sealing structure; and
- pressurizing the pressure chamber with a pressurizing fluid stream to provide a motive force for eversion of the flexible tube liner.

* * * * *